US012366054B2

(12) United States Patent
Nakajima et al.

(10) Patent No.: US 12,366,054 B2
(45) Date of Patent: Jul. 22, 2025

(54) HYDRAULIC CONTROL SYSTEM IN WORKING MACHINE

(71) Applicant: Caterpillar SARL, Geneva (CH)

(72) Inventors: Hideki Nakajima, Akashi (JP); Koichi Kiyasu, Akashi (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 18/717,534

(22) PCT Filed: Dec. 5, 2022

(86) PCT No.: PCT/EP2022/025552
§ 371 (c)(1),
(2) Date: Jun. 7, 2024

(87) PCT Pub. No.: WO2023/104331
PCT Pub. Date: Jun. 15, 2023

(65) Prior Publication Data

US 2025/0067023 A1 Feb. 27, 2025

(30) Foreign Application Priority Data

Dec. 7, 2021 (JP) ................................ 2021-198395

(51) Int. Cl.
*E02F 9/22* (2006.01)
*F15B 11/17* (2006.01)

(52) U.S. Cl.
CPC .......... *E02F 9/2228* (2013.01); *E02F 9/2242* (2013.01); *E02F 9/2292* (2013.01);
(Continued)

(58) Field of Classification Search
CPC ....... F15B 11/17; E02F 9/2225; E02F 9/2228; E02F 9/2239; E02F 9/2242
(Continued)

(56) References Cited

U.S. PATENT DOCUMENTS 5,193,342 A * 3/1993 Omberg ................ F15B 11/165
91/518
5,829,252 A * 11/1998 Hirata .................. E02F 9/2242
60/429

(Continued)

FOREIGN PATENT DOCUMENTS

EP 2980325 A1 2/2016
JP H09158903 A 6/1997

(Continued)

OTHER PUBLICATIONS

International Search Report related to Application No. PCT/EP2022/025552; reported on Mar. 24, 2023.

*Primary Examiner* — Michael Leslie

(57) ABSTRACT

To put new thought to a control method, and to obtain good operability, upon providing a control circuit for option hydraulic actuator in a hydraulic circuit for a working machine. There is provided an option merging oil passage that allows the discharge oil of the first, second hydraulic pumps to be merged thereinto, and the option merging oil passage is provided with an option control valve and a compensator valve, and is configured such that a variable relief valve is connected to a signal pressure introduction oil passage connected to the compensator valve, a supply pressure to an option hydraulic actuator can be variably controlled by changing a relief setting pressure of the variable relief valve; on the other hand, distributed flow rate computation with respect to the other hydraulic actuators, opening area control of the option control valve, the other hydraulic actuators control valves, and discharge pressure control of the first, second hydraulic pumps are optimized.

4 Claims, 11 Drawing Sheets

(52) U.S. Cl.
CPC ............ *E02F 9/2296* (2013.01); *F15B 11/17* (2013.01); *F15B 2211/30535* (2013.01); *F15B 2211/6055* (2013.01)

(58) Field of Classification Search
USPC .................................................... 60/421, 422
See application file for complete search history.

(56) References Cited

U.S. PATENT DOCUMENTS

| | | | | | |
|---|---|---|---|---|---|
| 6,134,887 | A * | 10/2000 | Bertotti | F15B 11/16 91/518 |
| 7,434,393 | B2 * | 10/2008 | Hesse | F15B 11/163 60/484 |
| 10,100,495 | B2 * | 10/2018 | Takahashi | E02F 9/2228 |
| 11,692,332 | B2 * | 7/2023 | Nakajima | F15B 11/165 60/421 |
| 11,761,464 | B2 * | 9/2023 | Ziemens | E02F 9/2228 60/327 |
| 12,018,459 | B2 * | 6/2024 | Nakajima | F15B 21/087 |
| 12,180,682 | B2 * | 12/2024 | Nakajima | E02F 9/2296 |
| 2014/0069091 | A1 * | 3/2014 | Franzoni | F15B 13/022 60/422 |
| 2018/0127949 | A1 | 5/2018 | Nakajima | |
| 2025/0052035 | A1 * | 2/2025 | Nakajima | E02F 9/2203 |

FOREIGN PATENT DOCUMENTS

| | | | |
|---|---|---|---|
| JP | 2004074331 | A | 3/2004 |
| JP | 2010168738 | A | 8/2010 |
| JP | 2022120978 | A | 8/2022 |

* cited by examiner (A)

(B)

(C)

HYDRAULIC CONTROL SYSTEM IN WORKING MACHINE

CROSS-REFERENCE TO RELATED APPLICATION

This Application is a 35 USC § 371 US National Stage filing of International Application No. PCT/EP2022/025552 filed on Dec. 5, 2022 which claims priority under the Paris Convention to Japanese Patent Application No. 2021-198395 filed on Dec. 7, 2021.

FIELD OF THE INVENTION

The present invention relates to a technical field of hydraulic control systems in working machines such as hydraulic shovels.

BACKGROUND OF THE INVENTION

Generally, among working machines such as hydraulic shovels, some are available, which a plurality of option hydraulic actuators is configured to be selectively attachable thereto. For example, in a hydraulic shovel, an option tool such as hydraulically driven breaker or crusher can be detachably attached, in place of a bucket for general purpose use as a working attachment.

In case where a hydraulic circuit for an option hydraulic actuator that drives such an option tool intends to be provided in a hydraulic circuit for a working machine, a circuit that can be shared by a plurality of option hydraulic actuators is required, for the purpose of space-saving and reduction of the number of parts; on the other hand, a circuit capable of responding to the control of an individual option hydraulic actuator is also required. For example, a circuit capable of controlling a supply pressures to the option hydraulic actuator so as to reach a pressure corresponding to a working pressure of individual option hydraulic actuator; or if the option hydraulic actuator requires a constant flow rate, a circuit capable of supplying a constant flow rate regardless of whether the option hydraulic actuator performs an independent operation or a combined operation with other hydraulic actuators; or a circuit that allows pressurized oil to be supplied from a single hydraulic pump regarding option hydraulic actuators such as small breakers or crushers that require only a small flow rate, and a circuit that allows pressurized oil to be supplied from a plurality of hydraulic pumps regarding option hydraulic actuators that require a large flow rate, such as large breakers or crushers.

Therefore, conventionally, upon controlling the supply pressure to the option hydraulic actuator so as to reach a pressure corresponding to the working pressure of individual option hydraulic actuator, a relief valve is disposed in a pair of actuator oil passages extending from the option control valve for performing oil supply and discharge control to and from the option hydraulic actuator, to the option hydraulic actuator, the supply pressure to the option hydraulic actuator is controlled in accordance with a setting pressure of the relief valve; as well as there is known a technique, in which, by using a variable relief valve capable of changing the setting pressure as a relief valve, the supply pressure to the option hydraulic actuator can be arbitrarily changed depending on individual option hydraulic actuator (for example, refer to Patent Literature 1).

On the other hand, there is proposed a technique, in which as a hydraulic circuit for a working machine equipped with an option hydraulic actuator, two hydraulic pumps of first and second pumps are provided; as well as first, second flow rate control valves that control the supply flow rates from the first, second hydraulic pumps, respectively; an option directional switching valve that allows the pressurized oil supplied from these first, second flow rate control valves to be merged and supplies the merged oil to the option hydraulic actuator (for example, refer to Patent Literature 2). In this hydraulic circuit, even an option hydraulic actuator that uses both the first, second hydraulic pumps as the hydraulic supply source, can reduce the number of directional switching valves for the option hydraulic actuator to only one; as well as either one of the first, second hydraulic pumps can act as the hydraulic supply source for the option hydraulic actuator can be, by closing either one of the first, second flow rate control valves.

PRIOR ART DOCUMENTS

Patent Documents

PATENT DOCUMENT 1: Japanese Patent Application Laid-Open No. 2010-168738

PATENT DOCUMENT 2: Japanese Patent Application Laid-Open No. 2017-20604

SUMMARY OF THE INVENTION

Problems to be Solved by the Invention

However, the hydraulic control system disclosed in the Patent Literature 1, upon controlling a supply pressure to an option hydraulic actuator so as to be a pressure corresponding to a working pressure of an individual option hydraulic actuator, requires a pair of variable relief valves disposed in a pair of actuator oil passages respectively, which hinders reduction of the number of parts and cost reduction.

Further, the hydraulic control system disclosed in Patent Literature 2, even if the option hydraulic actuator is supplied with pressurized oil from both of the first, second hydraulic pumps, can have only one directional switching valve for the option hydraulic actuator, but in order to respond to the option hydraulic actuator that is supplied with hydraulic pressure from either one of the first, second hydraulic pumps, requires first, second two flow rate control valves that control a supply flow rate from the first, second hydraulic pumps, respectively, which also hinders reduction of the number of parts and cost reduction. Further, the hydraulic control system disclosed in Patent Literature 2 is configured such that, at the time of combined operation for the option hydraulic actuator and the other hydraulic actuators, the discharge flow rate of the hydraulic pump acting as the hydraulic supply source for these hydraulic actuators is distributed in proportion to operation amounts of respective hydraulic actuators operation levers, but when distributed in this manner, the supply flow may come short, in case where the option hydraulic actuator requires a constant flow rate, and here there are problems to be solved by the present invention.

Means for Solving the Problem

The present invention has been created with an object of solving these problems in view of the above circumstances, and the invention of claim 1 provides a hydraulic control system in a working machine equipped with first, second hydraulic pumps; an option hydraulic actuator, which is selectively mounted to the working machine, whose hydraulic supply source is either one or both of the first, second hydraulic pumps; and other hydraulic actuators other than the option hydraulic actuator whose hydraulic supply sources are either one or both of the first, second hydraulic pumps, wherein the hydraulic control system further comprises first, second option supply oil passages, first, second other hydraulic actuators supply oil passages connected to the first, second hydraulic pumps respectively, acting as pressurized oil supply passages to the option hydraulic actuator, the other hydraulic actuators; an option merging oil passage that allows the first, second option supply oil passages to merge thereinto; option, other hydraulic actuators control valves that perform oil supply and discharge control to and from the option hydraulic actuator, the other hydraulic actuators respectively; and a control device that controls these option, the other hydraulic actuators control valves; on the other hand, wherein the option merging oil passage comprises the option control valve, and a pressure compensating valve, disposed on an upstream side of the option control valve, that operates in order to maintain a differential pressure, by introducing an inlet side pressure and an outlet side pressure of the option control valve, between the introduced inlet side pressure and outlet side pressure at a predetermined pressure; as well as, is configured such that, by connecting a variable relief valve that can vary a relief setting pressure in response to a control signal from the control device, to a signal pressure introduction oil passage that introduces the outlet side pressure of the option control valve to the pressure compensating valve, and lowering a pressure of the signal pressure introduction oil passage down to a relief setting pressure by the variable relief valve and introducing the pressure to the pressure compensating valve, a pressure of the option merging oil passage on the inlet side of the option control valve can be variably controlled by changing the relief setting pressure of the variable relief valve.

The invention of claim 2 provides the hydraulic control system in the working machine according to claim 1, wherein the hydraulic control system comprises first, second bleed valves for controlling respectively bleed flow rate that flows into an oil tank from the first, second hydraulic pumps in response to a control signal output from the control device, and is configured such that the discharge pressure of the first, second hydraulic pumps is controlled through a bleed flow rate control by the first, second bleed valves; as well as, the control device performs bleed flow rate control so that, in case where the option hydraulic actuator uses either one of the first, second hydraulic pumps as the hydraulic supply source, the discharge pressure of the one hydraulic pump acting as the hydraulic supply source be higher than the discharge pressure of the other hydraulic pump not acting as the hydraulic supply source; and in case where the option hydraulic actuator uses both the first, second hydraulic pumps as the hydraulic supply source, the discharge pressures of the first, second hydraulic pumps be equalized.

The invention of claim 3 provides the hydraulic control system in the working machine according to claim 1 or 2, wherein the control device comprises determines first, second required flow rates of the option hydraulic actuator, the other hydraulic actuators, and option first, second margin-added required flow rates obtained by adding a margin flow rate for differential pressure adjustment of the pressure compensating valve to the option first, second required flow rates, which the option hydraulic actuator, the other hydraulic actuators require of the first, second hydraulic pumps respectively, in proportion to operation amounts of the option, the other hydraulic actuators operation levers, and controls the discharge flow rates of the first, second hydraulic pumps, in accordance with these required flow rates; as well as, wherein in case where the other hydraulic actuators are operated, upon performing the discharge flow rate control, the other hydraulic actuators first, second required flow rates are used as required flow rates; on the other hand, in case where the option hydraulic actuator is operated, the option first, second margin-added required flow rates are used as required flow rates.

The invention of claim 4 provides the hydraulic control system in the working machine according to any one of claims 1 to 3, wherein the control device determines first, second required flow rates of the option hydraulic actuator, the other hydraulic actuators, and option first, second margin-added required flow rates obtained by adding a margin flow rate for differential pressure adjustment of the pressure compensating valve to the option first, second required flow rates, which the option hydraulic actuator, the other hydraulic actuators require of the first, second hydraulic pumps respectively, in proportion to operation amounts of the option, the other hydraulic actuators operation levers, and controls opening areas of the option, the other hydraulic actuators control valves respectively in accordance with these required flow rates; as well as, wherein regarding the option control valve, upon performing the opening area control, the control device controls an opening area so that a total flow rate obtained by adding up the option first, second required flow rates be supplied to the option hydraulic actuator; on the other hand, regarding the other hydraulic actuators control valves, determines other hydraulic actuators first, second distributed flow rates obtained by distributing the discharge flow rates of the first, second hydraulic pumps in proportion to the option first, second margin-added required flow rates, the other hydraulic actuators first, second required flow rates; and controls the opening areas so that a total flow rate obtained by adding up the hydraulic actuators first, second distributed flow rates be supplied to the other hydraulic actuators.

Favorable Effects of the Invention

According to the invention of claim 1, the upper limit pressure of pressurized oil supplied to an option hydraulic actuator can be variably controlled so as to be a pressure corresponding to individual option hydraulic actuator, by changing a relief setting pressure of a variable relief valve disposed in a signal pressure introduction oil passage connected to a pressure compensating valve, thereby enabling reduction of the number of parts and cost reduction.

According to the invention of claim 2, without separately providing valves, in the first, second option supply oil passages, for opening and closing the oil passages, in case where the option hydraulic actuator uses either one of the first, second hydraulic pumps as the hydraulic supply source, and in case where uses both hydraulic pumps as the hydraulic supply source, only pressurized oil supplied from the hydraulic pump acting as the hydraulic supply source can be supplied to the option merging oil passage, thereby enabling reduction of the number of parts and cost reduction.

According to the invention of claim 3, in case where the option hydraulic actuator is operated, first, second margin-added required flow rates obtained by adding a margin flow rate for differential pressure adjustment of a pressure compensating valve can be secured as a pump flow rate for the option hydraulic actuator.

According to the invention of claim 4, the supply flow rate to the option hydraulic actuator can be reliably secured, and such a malfunction that the supply flow rate to the option hydraulic actuator comes short at the time of combined operation with other hydraulic actuators can be reliably avoided; as well as good, combined operability with other hydraulic actuators can be ensured.

DETAILED DESCRIPTION OF THE INVENTION

Hereinbelow, embodiments of the present invention will be discussed with reference to the drawings.

Figure 1:
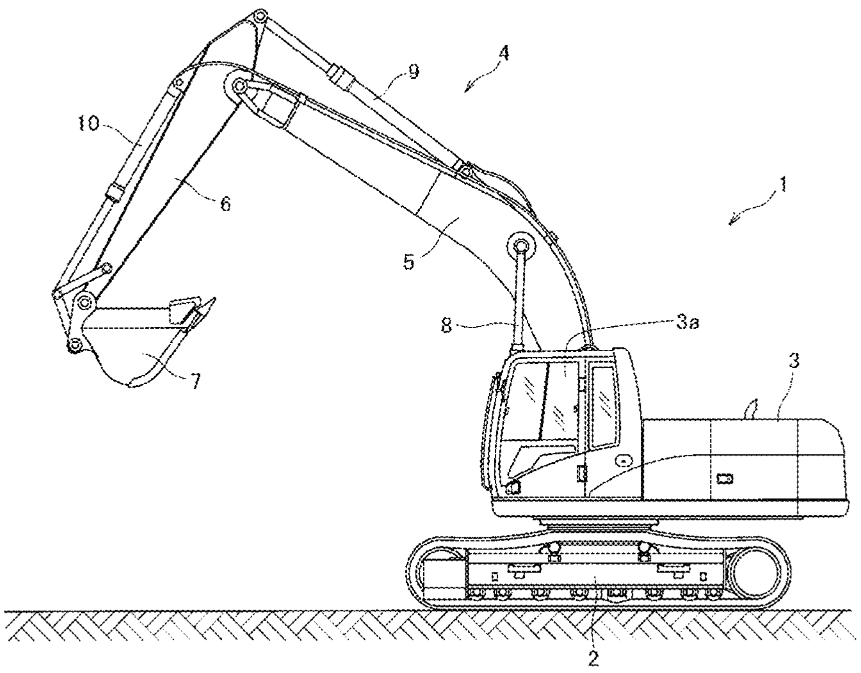
FIG. 1 is a side view of a hydraulic shovel.

FIG. 1 is a view illustrating a hydraulic shovel 1 which is an example of a working machine provided with a hydraulic control system of the present invention. The hydraulic shovel 1 is constituted of a lower traveling structure 2 of crawler type; an upper slewing structure 3 that is supported so as to slew freely above the lower traveling structure 2; and a working implement 4 that is mounted on the upper slewing structure 3, and other parts. Further the working implement 4 is constituted of a boom 5 whose base end portion is supported so as to swing freely upwardly and downwardly on the upper slewing structure 3; a stick 6 that is supported so as to swing freely backwardly and forwardly at the tip end portion of the boom 5; a bucket 7 that is attached so as to swing freely to the tip end portion of the stick 6, and others; as well as, the hydraulic shovel 1 is equipped with various types of hydraulic actuators including a boom cylinder 8, a stick cylinder 9, a bucket cylinder 10 for causing the boom 5, the stick 6, the bucket 7 to swing, respectively, and left and right traveling motors (not illustrated) for causing the lower traveling structure 2 to travel, a slewing motor 11 (illustrated in FIG. 2) for causing the upper slewing structure 3 to slew. Moreover, the hydraulic shovel 1 is adapted such that various hydraulically operated option tools (option attachments) including breaker, a crusher, a grapple, a tilt bucket, a rotary cutting attachment (all not illustrated) can be mounted selectively in place of the bucket 7, depending on their work contents. If an option tool is mounted, the bucket cylinder 10 operates as a hydraulic cylinder for causing the option tool to swing with respect to the stick 6.

Figure 2:
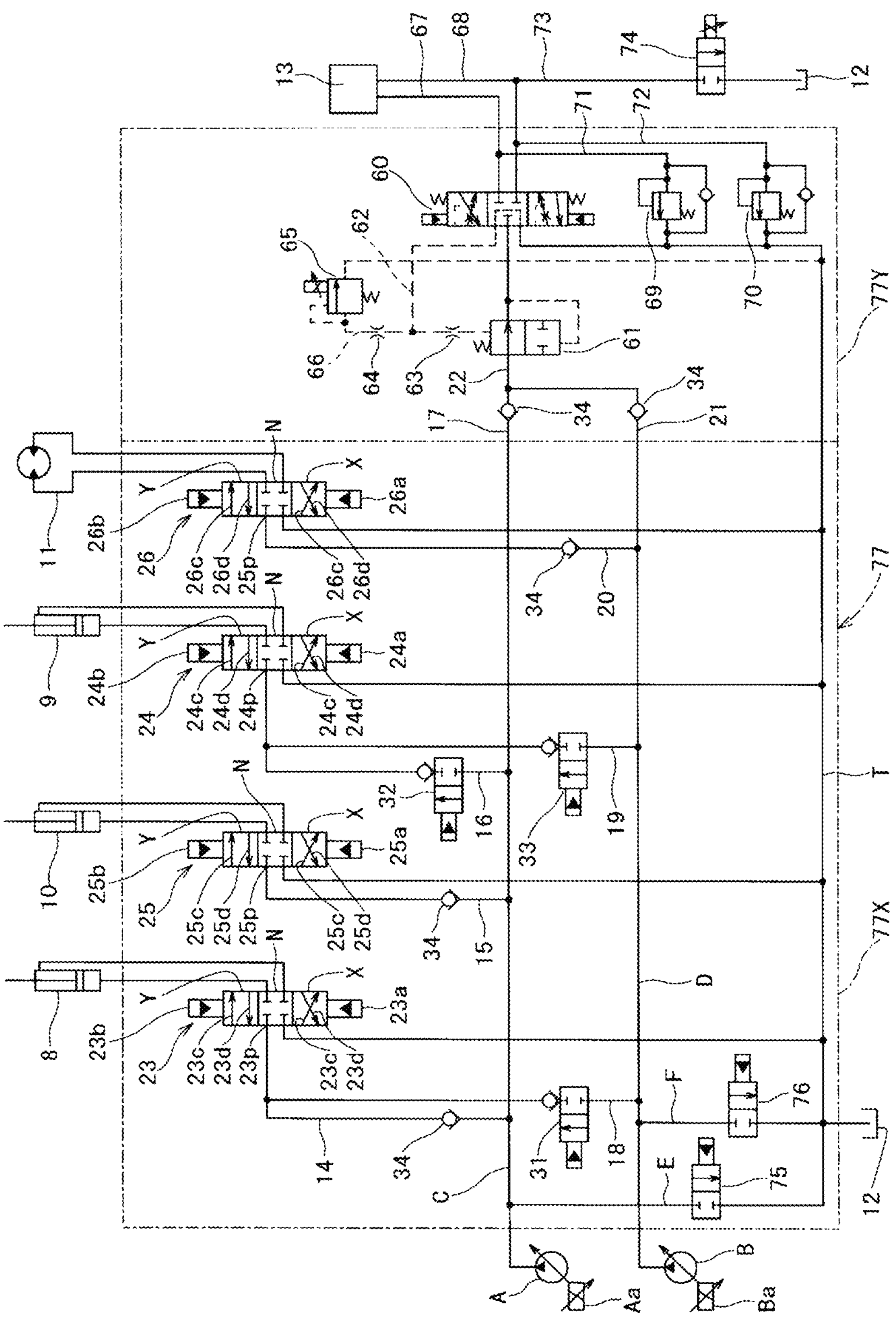
FIG. 2 is a hydraulic circuit diagram of a hydraulic shovel.

Next, a hydraulic control system provided in the hydraulic shovel 1 will be discussed with reference to the hydraulic circuit diagram illustrated in FIG. 2. In FIG. 2, the hydraulic circuit of the portion relating to the traveling motor is omitted.

In FIG. 2, reference symbols A, B denote a first, a second hydraulic pumps of variable displacement type; Aa, Ba denote displacement varying means for varying the displacements of the first, second hydraulic pumps A, B; and reference numeral 12 denotes an oil tank. 8, 9, 10, 11 denote the boom cylinder, the stick cylinder, the bucket cylinder, the slewing motor, which are hydraulic actuators permanently mounted in the hydraulic shovel 1. Further, 13 denotes an option hydraulic actuator, and the option hydraulic actuator 13 is a hydraulic actuator equipped in the option tool in order to drive the option tool that is selectively mounted to the hydraulic shovel 1; for example, a breaker hydraulic actuator (hereinafter simply referred to as a breaker) in case where the breaker is mounted as an option tool, and a grapple hydraulic actuator in case where a grapple is mounted. In the present embodiment, the boom cylinder 8 and the stick cylinder 9 are configured to use both the first, second hydraulic pumps A, B as hydraulic supply sources; the bucket cylinder 10 to use the first hydraulic pump A as a hydraulic supply source; and the slewing motor 11 to use the second hydraulic pump B as a hydraulic supply source. Further, the option hydraulic actuator 13 as described below, is configured to use either one or both of the first, second hydraulic pumps A, B as the hydraulic supply sources, depending on the flow rate required by the option hydraulic actuator 13 and on whether the option hydraulic actuator 13 performs independent operation or combined operation (simultaneous operation) with the other hydraulic actuators. In the present embodiment, the boom cylinder 8, the stick cylinder 9, the bucket cylinder 10, and the slewing motor 11 correspond to the other hydraulic actuators other than the option hydraulic actuator of the present invention.

Moreover, in FIG. 2, reference symbol C denotes a first pump line connected to the discharge side of the first hydraulic pump A; and a first boom supply oil passage 14, a first bucket supply oil passage 15, a first stick supply oil passage 16, and a first option supply oil passage 17 are connected to the first pump line C in a state where they are parallel with each other. D denotes a second pump line connected to the discharge side of the second hydraulic pump B, and a second boom supply oil passage 18, a second stick supply oil passage 19, a second slewing supply oil passage 20, and a second option supply oil passage 21 are connected to the second pump line D in a state where they are parallel with each other. The first, second boom supply oil passages 14, 18 are oil passages connecting respectively the first, second hydraulic pumps A, B to a boom control valve 23 described below. The first bucket supply oil passage 15 is an oil passage connecting the first hydraulic pump A to a bucket control valve 25. The first, second stick supply oil passages 16, 19 are oil passages connecting the first, second hydraulic pumps A, B to a stick control valve 24. The second slewing supply oil passage 20 is an oil passage connecting the second hydraulic pump B to a slewing control valve 26. The first, second option supply oil passages 17, 21 are oil passages connecting respectively the first, second hydraulic pumps A, B to an option merging oil passage 22 described below. The first boom, the first bucket, the first stick supply oil passages 14, 15, 16 correspond to first other hydraulic actuators supply oil passages of the present invention. The second boom, the second stick, the second slewing supply oil passages 18, 19, 20 correspond to second other hydraulic actuators supply oil passage of the present invention. Further, the boom, the stick, the bucket, the slewing control valves 23 to 26 correspond to the other hydraulic actuators control valves of the present invention.

A boom flow rate control valve 31 for controlling the supply flow rate from the second hydraulic pump B to the boom control valve 23 is disposed in the second boom supply oil passage 18; and first, second stick flow rate control valves 32, 33 for controlling the supply flow rates from the first, second hydraulic pumps A, B to the stick control valve 24 are disposed in the first, second stick supply oil passages 16, 19. The boom flow rate control valve 31, the first, second stick flow rate control valves 32, 33 serve as poppet valves that perform flow rate control by being pilot-operated by a boom flow rate control solenoid proportional valve 41; first, second stick flow rate control solenoid proportional valves 42, 43 (all illustrated in FIGS. 5 and 9) that are activated in response to control signals output from a controller 30, and have a backflow prevention function, thereby enabling adaption to allow for the flow of oil from the first, second hydraulic pumps A, B to the boom control valve 23, the stick control valve 24, but to block off the backflow.

On the other hand, in the first boom supply oil passage 14, the first bucket supply oil passage 15, the second slewing supply oil passage 20, the first, second option supply oil passages 17, 21, there are disposed no flow rate control valves like the boom flow rate control valve 31, the first, second stick flow rate control valves 32, 33 described above; and pressurized oil from the first hydraulic pump A or the second hydraulic pump B via the first boom supply oil passage 14, the first bucket supply oil passage 15, the second slewing supply oil passage 20, the first, second option supply oil passages 17, 21 is supplied directly to the boom control valve 23, the bucket control valve 25, the slewing control valve 26, the option merging oil passage 22 without the flow rate being controlled. A check valve 34 is disposed in each of the first boom supply oil passage 14, the first bucket supply oil passage 15, the second slewing supply oil passage 20, the first, second option supply oil passages 17, 21, and is adapted to allow for the flow of oil from the first, second hydraulic pumps A, B into the boom control valve 23, the bucket control valve 25, the slewing control valve 26, the option merging oil passage 22, but to block off the backflow.

Thus, pressurized oil from the first hydraulic pump A via the first boom supply oil passage 14, and pressurized oil from the second hydraulic pump B via the second boom supply oil passage 18 can be supplied to a pump port 23*p* of the boom control valve 23; as well as, the pressurized oil from the second hydraulic pump B will be supplied to the boom control valve 23 in a state where (including the shut-off state) its flow rate is controlled by the boom flow rate control valve 31 disposed in the second boom supply oil passage 18. Also, the pressurized oil from the first hydraulic pump A via the first stick supply oil passage 16 and the pressurized oil from the second hydraulic pump B via the second stick supply oil passage 19 can be supplied to the pump port 24*p* of the stick control valve 24; as well as, the pressurized oil from the first, second hydraulic pumps A, B will be supplied to the stick control valve 24 in a state where (including the shut-off state) its flow rate is controlled by the first, second stick flow rate control valves 32, 33 disposed respectively in the first, second stick supply oil passages 16, 19.

The boom, the stick, the bucket, the slewing control valves 23 to 26, which are spool valves of closed center type that control the supply and discharge flow rate to and from the boom cylinder 8, the stick cylinder 9, the bucket cylinder 10, the slewing motor 11 as well as switches between the supply/discharge directions, includes a pair of pilot ports 23*a*, 23*b* to 26*a*, 26*b*, connected respectively to a boom, a stick, a bucket, a slewing solenoid proportional valves 44*a*, 44*b* to 47*a*, 47*b* (illustrated in FIGS. 5 and 9) that outputs a pilot pressure in response to a control signal from the controller 30; supply valve passages 23*c* to 26*c* that allow for the supply of pressurized oil from the first or/and second hydraulic pumps A, B to the boom cylinder 8, the stick cylinder 9, the bucket cylinder 10, the slewing motor 11; discharge valve passages 23*d* to 26*d* that allow for the flow of discharged oil from the boom cylinder 8, the stick cylinder 9, the bucket cylinder 10, the slewing motor 11 into a tank line T extending to the oil tank 12. The boom, stick, the bucket, the slewing control valves 23 to 26 are configured to be positioned at a neutral position N where to close the supply valve passages 23*c* to 26*c* and the discharge valve passages 23*d* to 26*d* and not to perform supply and discharge control to and from corresponding hydraulic actuators (the boom cylinder 8, the stick cylinder 9, the bucket cylinder 10, the slewing motor 11) in a state where a pilot pressure is not input to both the pilot ports 23*a*, 23*b* to 26*a*, 26*b*, but to be switched to an actuation position X or Y where to open the supply valve passages 23*c* to 26*c* and the discharge valve passages 23*d* to 26*d*, to perform the supply and discharge control to and from the hydraulic actuators, by a pilot pressure being input to the one or the other pilot ports 23*a*, 23*b* to 26*a*, 26*b*. Then, the opening areas of the supply valve passages 23*c* to 26*c* and the discharge valve passages 23*d* to 26*d* when positioned at the actuation position X or Y is controlled to increase or decrease depending on a spool stroke amount associated with an increase or decrease of a pilot pressure output from the boom, the stick, the bucket, the slewing solenoid proportional valves 44*a*, 44*b* to 47*a*, 47*b* to the pilot ports 23*a*, 23*b* to 26*a*, 26*b* of the boom, the stick, the bucket, the slewing control valves 23 to 26.

Then, the supply flow rate and discharge flow rate to and from the bucket cylinder 10, the slewing motor 11 are controlled in accordance with an opening area of the supply valve passages 25*c*, 26*c*, the discharge valve passages 25*d*, 26*d* of the bucket, the slewing control valves 25, 26.

Further, the supply flow rate to the boom cylinder 8 is controlled in accordance with an opening area of the supply valve passage 23*c* of the boom control valve 23, regarding the supply flow rate from the first hydraulic pump A via the first boom supply oil passage 14 provided with no flow rate control valve; on the other hand, regarding the supply flow rate from the second hydraulic pump B via the second boom supply oil passage 18 provided with the boom flow rate control valve 31, the supply flow rate to the boom cylinder 8 becomes "zero" in a state where the boom flow rate control valve 31 is closed, and in a state where the boom flow rate control valve 31 is open, the supply flow rate to the boom cylinder 8 is controlled in accordance with an opening area of the boom flow rate control valve 31 and an opening area of the supply valve passage 23*c* of the boom control valve 23. On the other hand, the discharge flow rate from the boom cylinder 8 is controlled in accordance with an opening area of the discharge valve passage 23*d* of the boom control valve 23.

Also, the supply flow rate to the stick cylinder 9, regarding the supply flow rate from the first hydraulic pump A via the first stick supply oil passage 16 provided with the first stick flow rate control valve 32, becomes "zero" in a state where the first stick flow rate control valve 32 is closed; and is controlled in accordance with an opening area of the first stick flow rate control valve 32 and an opening area of the supply valve passage 24*c* of the stick control valve 24 in a state where the first stick flow rate control valve 32 is open; on the other hand, regarding the supply flow rate from the second hydraulic pump B via the second stick supply oil passage 19 provided with the second stick flow rate control valve 33, the supply flow rate to the stick cylinder 9 becomes "zero" in a state where a second stick flow rate control valve 33 is closed, and in a state where a second stick flow rate control valve 33 is open, and is controlled in accordance with an opening area of the second stick flow rate control valve 33, and an opening area of the supply valve passage 24*c* of the stick control valve 24. On the other hand, the discharge flow rate from the stick cylinder 9 will be controlled in accordance with an opening area of the discharge valve passage 24*d* of the stick control valve 24.

On the other hand, the option merging oil passage 22 serves as an oil passage formed by the downstream side of the first option supply oil passage 17 connected to the first hydraulic pump A and the downstream side of the second option supply oil passage 21 connected to the second hydraulic pump B being merged thereinto, and in the option merging oil passage 22, there are disposed an option control valve 60 described below and a compensator valve 61 (which corresponds to the pressure compensating valve of the present invention) located on the upstream side of the option control valve 60.

Figure 3:
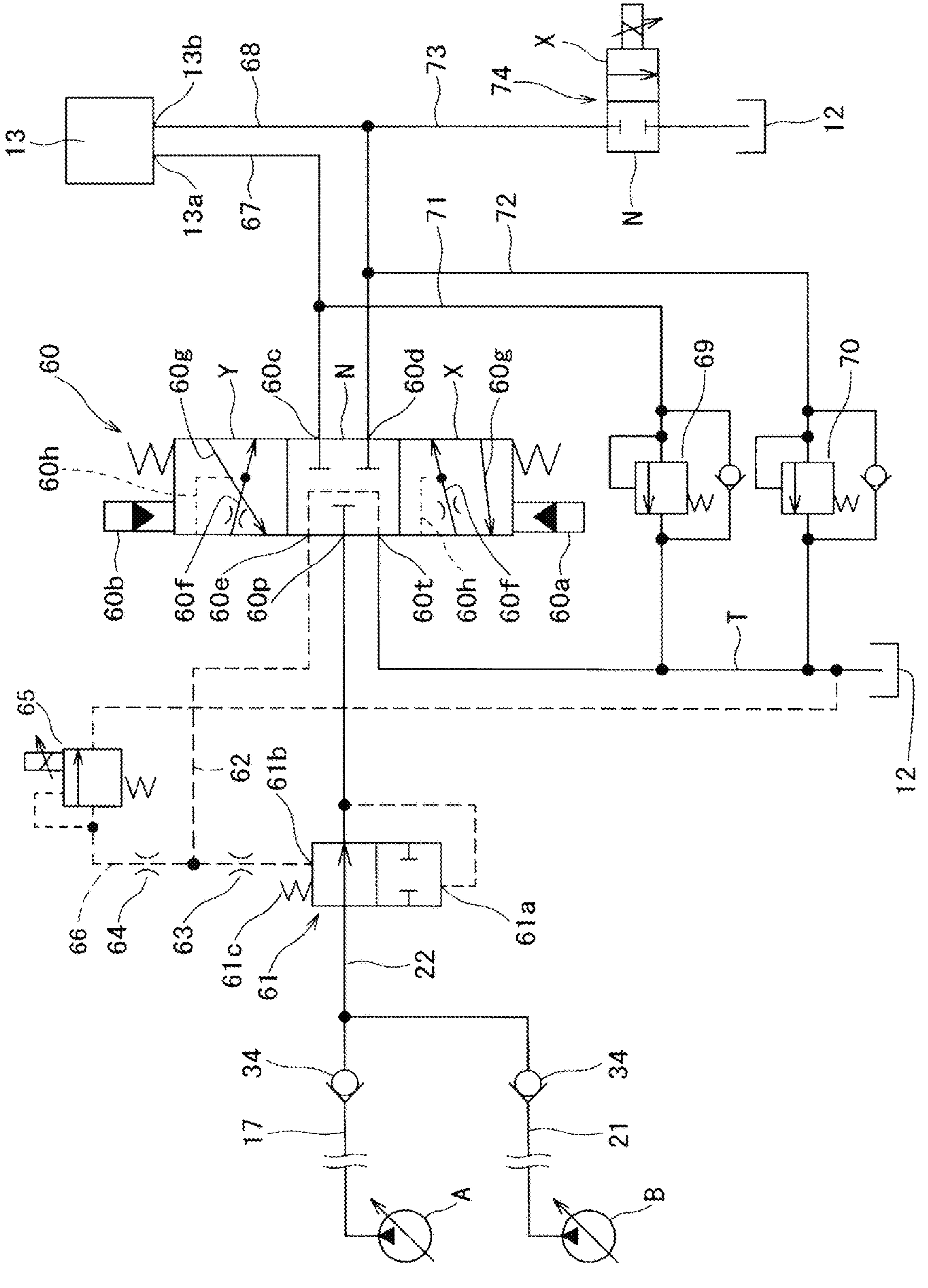
FIG. 3 is a partially enlarged hydraulic circuit diagram of a portion related to an option hydraulic actuator.

The option control valve 60, which is a spool valve of closed center type that controls the supply and discharge flow rate to and from the option hydraulic actuator 13 as well as switches between the supply and discharge directions, as illustrated in the enlarged hydraulic circuit diagram of FIG. 3, includes first, second pilot ports 60*a*, 60*b* respectively connected to a first, second option solenoid proportional valves 48*a*, 48*b* (illustrated in FIGS. 5 and 9) that output pilot pressure in response to control signals output from the controller 30; a pump port 60*p* connected to the option merging oil passage 22; a tank port 60*t* connected to the tank line T; the one actuator port 60*c* connected to the one port 13*a* of the option hydraulic actuator 13; the other actuator port 60*d* connected to the other port 13*b* of the option actuator 13; and a load pressure output port 60*e* connected to the second pilot port 61*b* of the compensator valve 61 described below via a signal pressure introduction oil passage 62. Then, the option control valve 60 is configured to be positioned at the neutral position N where not perform the supply and discharge control to and from the option hydraulic actuator 13, in a state where a pilot pressure is not input to both the first, second pilot ports 60*a*, 60*b*, and to cause the load pressure output port 60*e* to communicate with the tank port 60*t*, but to be switched to a first actuation position X by a pilot pressure being input to the first pilot port 60*a*, to open a supply valve passage 60*f* extending from the pump port 60*p* to the one actuator port 60*c*, a discharge valve passage 60*g* extending from the other actuator port 60*d* to the tank port 60*t*, and a load pressure valve passage 60*h* extending from the downstream side of the supply valve passage 60*f* to the load pressure output port 60*c*; and also switched to a second actuation position Y by a pilot pressure being input to the second pilot port 60*b*, to open the supply valve passage 60*f* extending from the pump port 60*p* to the other actuator port 60*d*, the discharge valve passage 60*g* extending from the one actuator port 60*c* to the tank port 60*t* and a load pressure valve passage 60*h* extending from the downstream side of the supply valve passage 60*f* to the load pressure output port 60*e*. Then, the opening area of the supply valve passage 60*f* and the discharge valve passage 60*g* is controlled to increase or decrease depending on a stroke amount of the spool which is moved by a pilot pressure output from the first, second option solenoid proportional valves 48*a*, 48*b*; as well as, the supply flow rate and discharge flow rate to and from the option hydraulic actuator 13 will be controlled in accordance with an opening area of the supply valve passage 60*f*, the discharge valve passage 60*g*, respectively. Moreover, the option control valve 60 at the first, second actuation positions X, Y is adapted to allow an outlet side pressure of the option control valve 60 (a downstream-side pressure of the supply valve passage 60*f*, a load pressure of the option hydraulic actuator 13) to be introduced into the signal pressure introduction oil passage 62 by the load pressure valve passage 60*h* being opened.

By the way, as the option hydraulic actuator 13, there are various kinds including ones whose pressurized oil supply direction is one direction like a one-direction rotary motor or a single-acting cylinder (e.g. breakers), ones whose pressurized oil supply direction is bi-direction like a bi-directional rotary motor or a double-acting cylinder (e.g. crushers), ones requiring a large flow rate (e.g. large-sized breakers and crushers), and ones requiring only a small flow rate (e.g. small-sized breakers and crushers), and the option control valve 60 shares the use of the option hydraulic actuator 13 available in various types. In other words, switching the option control valve 60 between the first actuation position X and the second actuation position Y enables performing bi-directional supply of pressurized oil to the option hydraulic actuator 13; and using only either one actuation position of the first actuation positions X and the second actuation positions Y enables performing one-directional supply of pressurized oil; but in the present embodiment, the use of the first actuation positions X is set, in case of performing one-directional supply of pressurized oil.

On the other hand, the signal pressure introduction oil passage 62 serves as an oil passage extending from the load pressure output port 60*e* of the option control valve 60 to the second pilot port 61*b* of the compensator valve 61. In the signal pressure introduction oil passage 62, a first throttle 63 is disposed; as well as a signal pressure relief oil passage 66 extending to the tank line T via a second throttle 64 and a variable relief valve 65 is branched and formed from the signal pressure introduction oil passage 62 extending from the load pressure output port 60*e* of the option control valve 60 to the first throttle 63. The variable relief valve 65 serve as an solenoid proportional relief valve that capable of changing a relief setting pressure LP in response to a control signal from the controller 30, in case where the relief setting pressure LP of the variable relief valve 65 is lower than a load pressure of the option hydraulic actuator 13 that is introduced into the signal pressure introduction oil passage 62, a load signal pressure input to the second pilot port 61*b* of the compensator valve 61 is lowered down to the relief setting pressure LP.

The compensator valve 61 includes a first pilot port 61*a* to which a first pilot pressure that presses the valve body of the compensator valve 61 to a closed side is input; and a second pilot port 61*b* to which a second pilot pressure that presses the valve body to an open side is input; and a spring 61*c* that presses to the open side, and an opening area is controlled such that a differential pressure between the first pilot pressure and the second pilot pressure is held at a predetermined pressure K that is determined by the spring 61*c*. Then, the first pilot port 61*a* of the compensator valve 61 is connected to an option merging oil passage 22 on the inlet side of the option control valve 60, and a pressure of the option merging oil passage 22 is input thereto. Further, the second pilot port 61*b* is connected to the signal pressure introduction oil passage 62, and in case where a load pressure of the option hydraulic actuator 13 is less than or equal to the relief setting pressure LP of the variable relief valve 65, the load pressure of the option hydraulic actuator 13 is adapted to be input; on the other hand, the load pressure of the option hydraulic actuator 13 is higher than the relief setting pressure LP, a load signal pressure reduced to the relief setting pressure LP is adapted to be input. Thus, in case where a load pressure of the option hydraulic actuator 13 is less than or equal to the relief setting pressure LP, a pressure PO of the option merging oil passage 22 is controlled so as to be higher than the load pressure of the option hydraulic actuator 13 by the predetermined pressure K due to the action of the compensator valve 61; on the other hand, in case where the load pressure of the option hydraulic actuator 13 is higher than the relief setting pressure LP, the pressure PO of the option merging oil passage 22 is controlled so as to be higher than the relief setting pressure LP by the predetermined pressure K. Accordingly, by variably controlling the relief setting pressure LP of the variable relief valve 65 in response to a control signal from the controller 30, the pressure PO of the option merging oil passage 22 on the inlet side of the option control valve 60 can be controlled so as to be a pressure (less than or equal to (LP+K) (PO≤(LP+K)), which is higher than the relief setting pressure LP by the predetermined pressure K.

Moreover, in FIGS. 2 and 3, reference numeral 67 denotes a first actuator oil passage extending from the one actuator port 60*c* of the option control valve 60 to the one port 13*a* of the option hydraulic actuator 13, and 68 denotes a second actuator oil passage extending from the other actuator port 60*d* of the option control valve 60 to the other port 13*b* of the option hydraulic actuator 13; in these first, second actuator oil passages 67, 68, first, second option relief oil passages 71, 72 extending to the tank line T are branched and formed via first, second option relief valves 69, 70. The first, second option relief valves 69, 70 are actuated so as to let high pressurized oil to escape to the oil tank 12 in case where the first, second actuator oil passages 67, 68 become high pressure due to dynamic pressure fluctuations such as when a surge pressure is generated due to an external force like a collision, but a relief setting pressure of the first, second option relief valves 69, 70 is set to a driving pressure of the highest pressure among the driving pressures of the option hydraulic actuator 13 selectively mounted to the hydraulic shovel 1. The first, second option relief valves 69, 70 use inexpensive ones that cannot change electrically their relief setting pressure. In addition, the relief valves are connected to oil passages connecting the boom control valve 23, the stick control valve 24, the bucket control valve 25, the slewing control valve 26, with the boom cylinder 8, the stick cylinder 9, the bucket cylinder 10, the slewing motor 11 respectively, but are omitted in FIG. 2.

Figure 4:
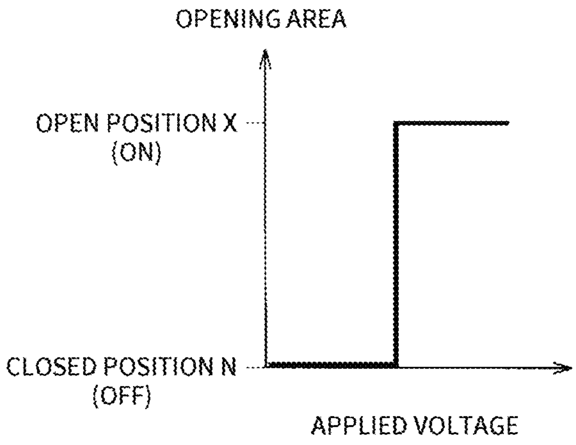
FIG. 4 is a diagram illustrating opening characteristics of a switching valve.

Moreover, in FIGS. 2 and 3, reference numeral 73 denotes a bypass oil passage that is branched and formed from the first or second actuator oil passages 67, 68 extending to the oil tank 12. In the bypass oil passage 73, a switching valve 74 is disposed. The switching valve 74 is, as illustrated in FIG. 4, is a two-position switching valve that is turned into ON/OFF by an applied voltage from the controller 30 and switched to a closed position N, and an open position X; and switching the switching valve 74 to the open position X is adapted to enable discharged oil from the option hydraulic actuator 13 to flow directly to the oil tank 12 without passing through the discharge valve passage 60*g* of the option control valve 60. Then, like a breaker for example, in case where the option hydraulic actuator 13 is mounted, which requires back pressure reduction with pressurized oil supply direction being one direction, the back pressure exerted on the option hydraulic actuator 13 is adapted to be reliably reduced by opening the switching valve 74 (switching to the open position X) and allowing the discharged oil from the option hydraulic actuator 13 to flow from the bypass oil passage 73 into the oil tank 12. In addition, the switching valve 74 is an inexpensive one that is switched by ON/OFF as described above, and therefore it is adapted to enable performing the back pressure reduction control at a low cost compared to the case of using a variable relief valve, for example. In addition, the bypass oil passage 73, in case where there is mounted the option hydraulic actuator 13 that requires the back pressure reduction with its pressurized oil supply direction being one direction, is branched and formed from an actuator oil passage that serves as a return oil passage from the option hydraulic actuator 13. In the present embodiment, a bypass oil passage 73 is branched and formed from the second actuator oil passage 68. However, in case where the first actuator oil passage 67 serves as a return oil passage from the option hydraulic actuator 13, the bypass oil passage 73 is branched and formed from the first actuator oil passage 67.

Moreover, in FIG. 2, reference symbols E, F denote first, second bleed lines branched and formed respectively from upstream positions of all the supply oil passages 14 to 21 connected to the first, second pump lines C, D, extending to the tank line T. In first, second bleed valves 75, 76, the first, second bleed lines E, F are disposed respectively. These first, second bleed valves 75, 76 are actuated by a pilot pressure output from a first, a second bleed solenoid proportional valves 49*a*, 49*b* (illustrated in FIGS. 5 and 10) to increase or decrease the opening area, and thereby being adapted to control so as to increase or decrease a bleed flow rate flowing from the first, second hydraulic pumps A, B via the first, second bleed lines E, F to the oil tank 12. Then, the pressure of the first, second pump lines C, D (discharge pressures of the first, second hydraulic pumps A, B) is adapted to be controlled by the bleed flow rate control by the first, second bleed valves 75, 76.

Moreover, in FIG. 2, reference numeral 77 denotes a valve block in which various types of valves for performing oil supply and discharge control to and from the above-described various types of hydraulic actuators (the boom cylinder 8, the stick cylinder 9, the bucket cylinder 10, the slewing motor 11, the option hydraulic actuator 13) are incorporated. The valve block 77 is formed by an option valve block 77Y incorporating therein various types of valves for controlling the option hydraulic actuator (the option control valve 60, the compensator valve 61, the variable relief valve 65, the first, second option relief valves 69, 70, etc.) being assembled integrally to a main valve block X incorporating therein various types of valves for controlling permanently provide hydraulic actuators (the boom, the stick, the bucket, the slewing control valves 23 to 26, the boom, the first, the second stick flow rate control valves 31 to 33, etc.) and the first, second bleed valves 75, 76, etc. The bypass oil passage 73 and the switching valve 74 are provided outside the valve block 77.

Figure 5:
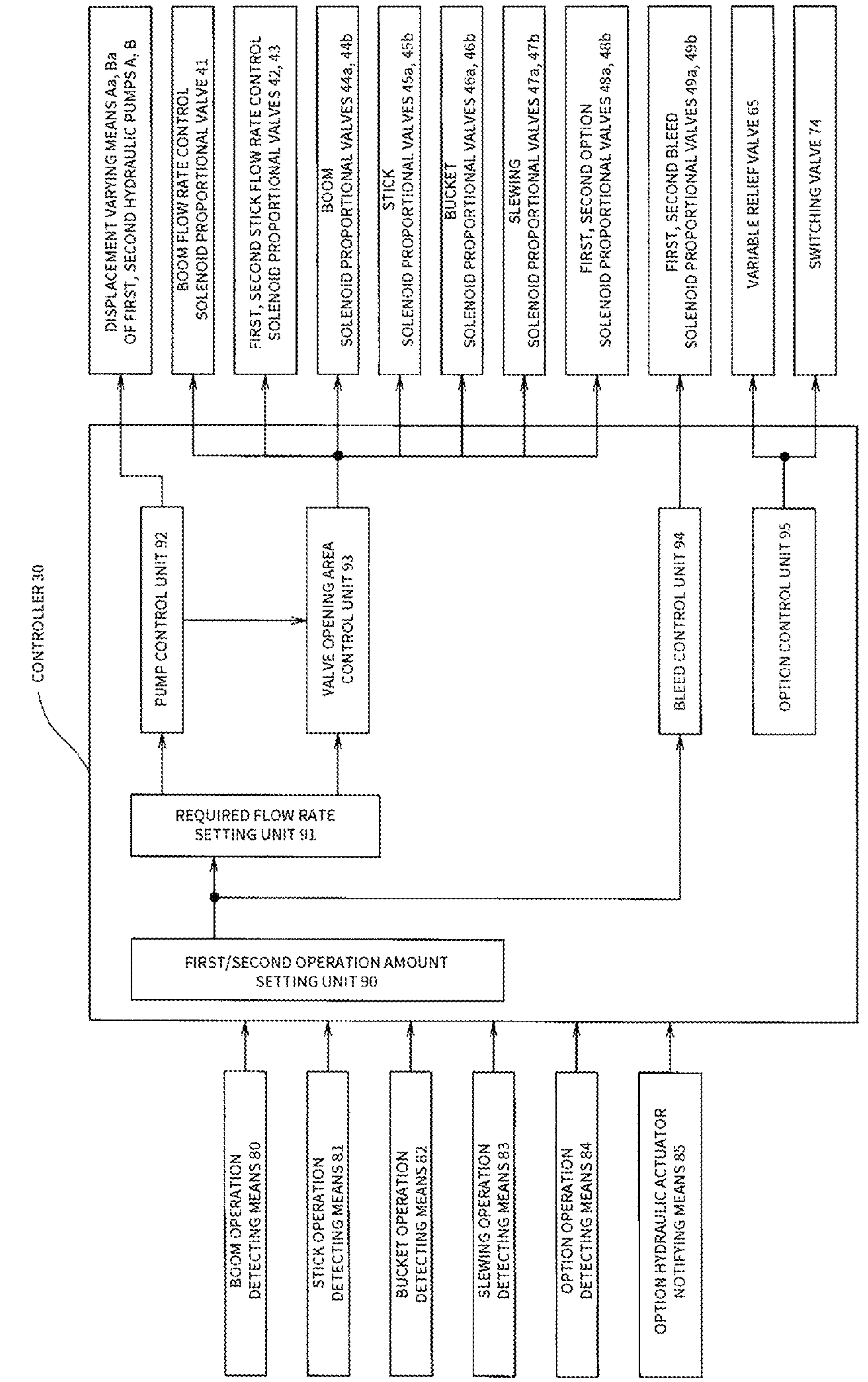
FIG. 5 is a block diagram illustrating the configuration of a controller.

On the other hand, the controller 30 (corresponding to a control means of the present invention), as illustrated in the block diagram of FIG. 5, is configured to connect to its input side, a boom operation detecting means 80, a stick operation detecting means 81, a bucket operation detecting means 82, a slewing operation detecting means 83, an option operation detecting means 84 for detecting an operation direction and an operation amount of a boom operation lever, a stick operation lever, a bucket operation lever, a slewing operation lever, an option operation lever, respectively; an option hydraulic actuator notifying means 85 described below; a pressure sensor (not illustrated) for detecting a pump pressure of the first, second hydraulic pumps A, B; pressure sensors (all not illustrated) for detecting load pressures of the boom cylinder 8, the stick cylinder 9, the bucket cylinder 10, the slewing motor 11, the option hydraulic actuator 13, etc.; and to connect to its output side, displacement varying means Aa, Ba of the first, second hydraulic pumps A, B; the boom flow rate control solenoid proportional valve 41 that outputs a pilot pressure to the boom flow rate control valve 31; the first, second stick flow rate control solenoid proportional valves 42, 43 that output a pilot pressure to the first, second stick flow rate control valves 32,d 33 respectively; the boom, the stick, the bucket, the slewing solenoid proportional valves 44*a*, 44*b* to 47*a*, 47*b* that output a pilot pressure to the boom, the stick, the bucket, the slewing control valves 23 to 26 respectively; the first, second option solenoid proportional valves 48*a*, 48*b* that output a pilot pressure to the option control valve 60; the first, the second bleed solenoid proportional valves 49*a*, 49*b* that output a pilot pressure to the first, second bleed valves 75, 76; the variable relief valve 65; the switching valve 74, etc.; as well as, to perform discharge flow rate control for the first, second hydraulic pumps A, B; flow rate control for the first, second bleed lines E, F; oil supply and discharge control to and from the boom cylinder 8, the stick cylinder 9, the bucket cylinder 10, the slewing motor 11, the option hydraulic actuator 13, etc. in a first/second operation amount setting unit 90, a required flow rate setting unit 91, a pump control unit 92, a valve opening area control unit 93, a bleed control unit 94, an option control unit 95, etc. described below. The option hydraulic actuator notifying means 85, in case where the option hydraulic actuator 13 is mounted, is a means for notifying the controller 30 of various types of information such as the type and specification of the option hydraulic actuator 13, or values of option upper limit pressure PU described below. In the present embodiment, a monitor device (not illustrated) disposed in a cab 3*a* of the hydraulic shovel 1 is provided as the option hydraulic actuator notifying means 85, and it is adapted to enable notifying various pieces of information about the option hydraulic actuator 13 to the controller 30 by the operation of the monitor device, and to enable changing various pieces of information. Also, in FIG. 5, the option hydraulic actuator notifying means 85 is provided outside the controller 30, but it is configured to provide at least a part of the information and functions contained in the option hydraulic actuator notifying means 85 within the controller 30.

Next, control performed by a setting unit and a control unit provided in the controller 30 will be discussed.

Figure 6:
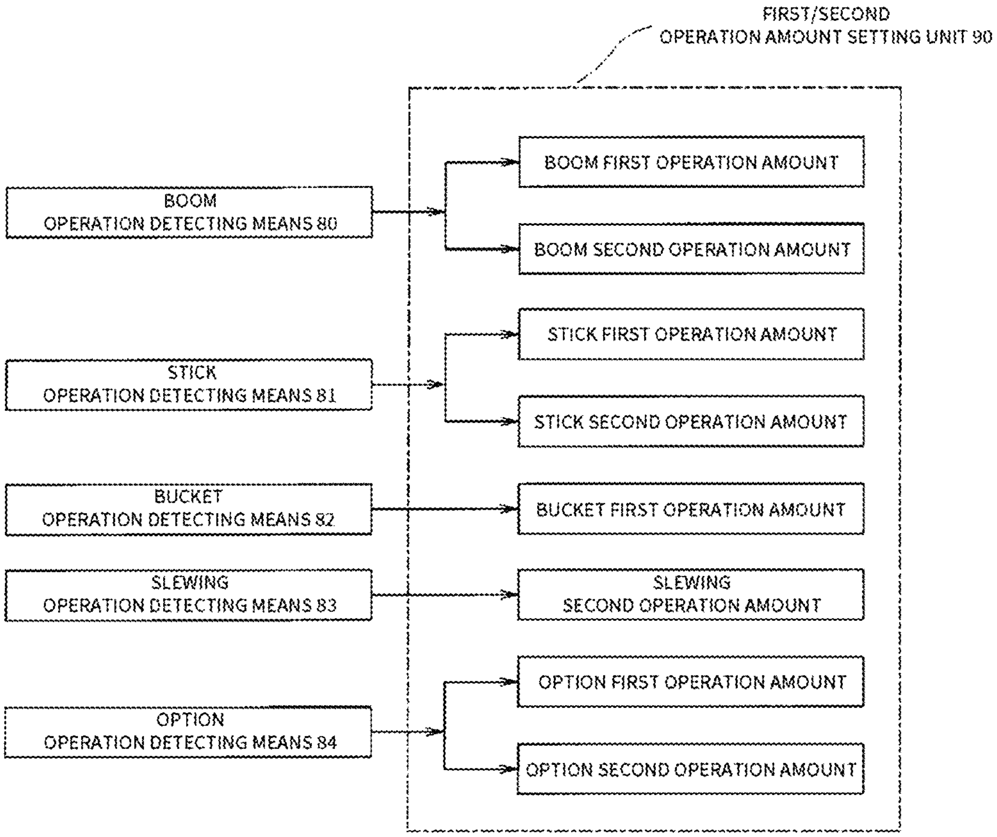
FIG. 6 is a control block diagram of first, second operation amounts setting unit.

The first/second operation amount setting unit 90, when operation signals are input from the boom, the stick, the bucket, the slewing, the option operation detecting means 80 to 84, in response to these operation signals, sets a first operation amount which the first hydraulic pump A serves and a second operation amount which the second hydraulic pump B serves, regarding respective operation amounts of operation levers. The setting of the first, second operation amounts is performed in accordance with pre-stored data, depending on the first, second hydraulic pumps A, B serving as the hydraulic supply sources for operated hydraulic actuators (the boom cylinder 8, the stick cylinder 9, the bucket cylinder 10, the slewing motor 11, the option hydraulic actuator 13), the operation amounts of the operation levers, hydraulic actuators to be combinedly operated (operated simultaneously), the type and specification of the option hydraulic actuator 13. For example, in the present embodiment, since the bucket cylinder 10 uses only the first hydraulic pump A as a hydraulic supply source, only a bucket first operation amount is set when a bucket operation lever is operated; and since the slewing motor 11 uses only the second hydraulic pump B as a hydraulic supply source, only a slewing second operation amount is set when the slewing operation lever is operated. In case where the boom cylinder 8 is supplied with pressurized oil from both the first, second hydraulic pumps A, B, boom first, second operation amounts are set; but only boom first operation amount is set when supplied with pressurized oil from only the first hydraulic pump A. In case where the stick cylinder 9 is supplied with pressurized oil from both the first, second hydraulic pumps A, B, stick first, second operation amounts are set; but only stick first operation amount is set when supplied with pressurized oil from only the first hydraulic pump A, and only stick second operation amount is set when supplied with pressurized oil from only the second hydraulic pump B. In case where the option hydraulic actuator 13 is supplied with pressurized oil from both the first, second hydraulic pumps A, B, option first, second operation amounts are set, but when supplied with pressurized oil only from the first hydraulic pumps A, only option first operation amount is set, and when supplied with pressurized oil only from the second hydraulic pumps B, only option second operation amount is set (see FIG. 6). Data for setting the first, second operation amount is stored in the first/second operation amount setting unit 90 as control parameters and is adapted to be changed using the monitor device or the like, according to work contents performed by the hydraulic shovel 1 and the type and specification of the option hydraulic actuator 13.

Figure 8:
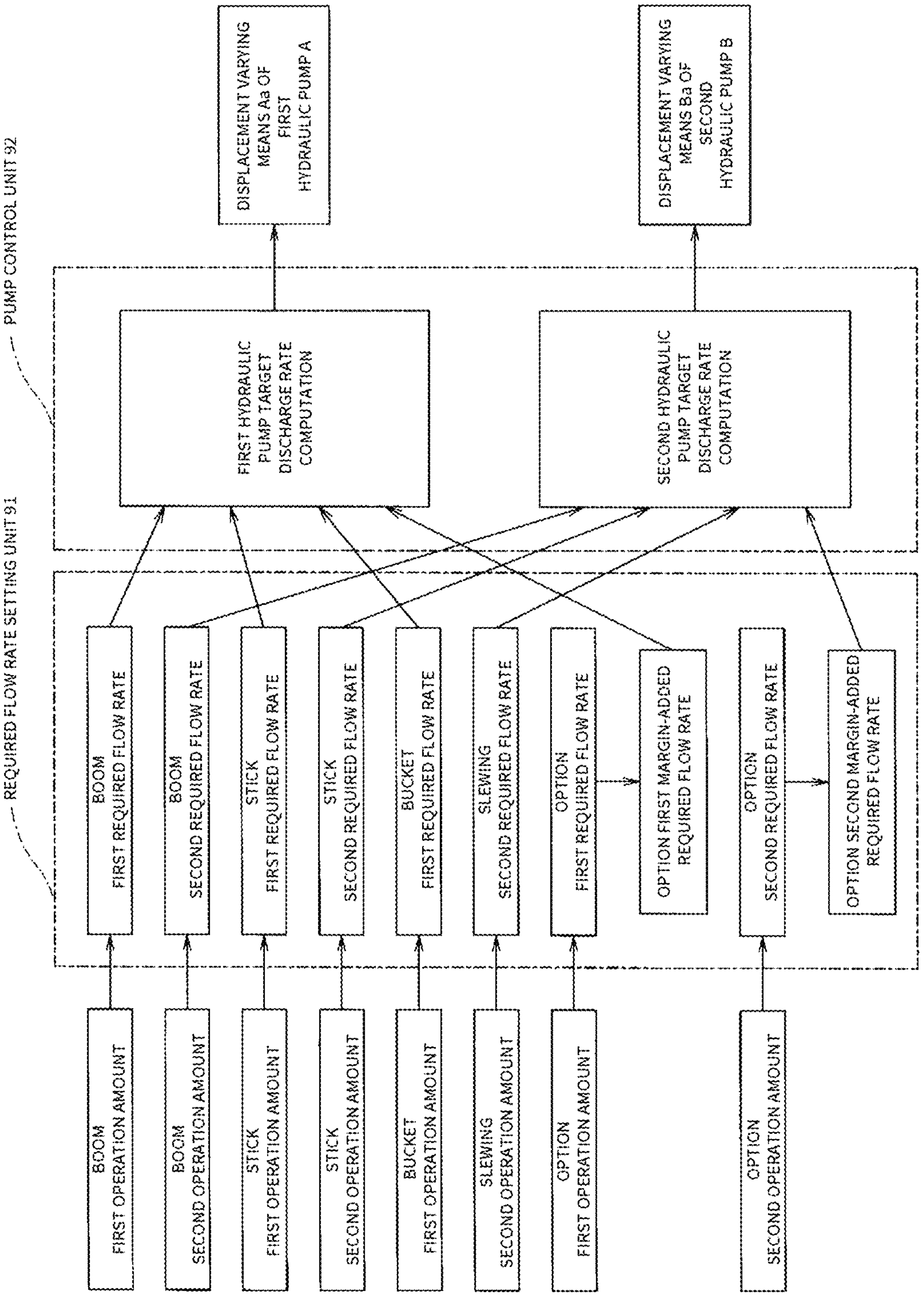
FIG. 8 is a control block diagram of required flow rate setting unit and a pump control unit.

Further, the required flow rate setting unit 91 determines required flow rates (boom first required flow rate, boom second required flow rate, stick first required flow rate, stick second required flow rate, bucket first required flow rate, slewing second required flow rate, option first required flow rate, option second required flow rate) which respective hydraulic actuators (the boom cylinder 8, the stick cylinder 9, the bucket cylinder 10, the slewing motor 11, the option hydraulic actuator 13) requires of the first, second hydraulic pumps A, B, in accordance with the first, second operation amounts that have been set by the first, second operation amounts setting unit 90. Moreover, the required flow rate setting unit 91 sets option first, second margin-added required flow rates by adding a margin flow rate a to the option first, second required flow rates (refer to FIG. 8). The margin flow rate a, in case where pressurized oil is supplied to the option hydraulic actuator 13 from the first, second hydraulic pumps A, B, is a flow rate to be added to the option first, second required flow rates in order to avoid the shortage of pressurized oil to be supplied to the option hydraulic actuator 13 by the flow rate control performed by the above-described compensator valve 61 for the purpose of differential pressure adjustment. In case where the option first, second required flow rates are "zero", the option first, second margin-added required flow rates become also "zero".

Figure 7A:
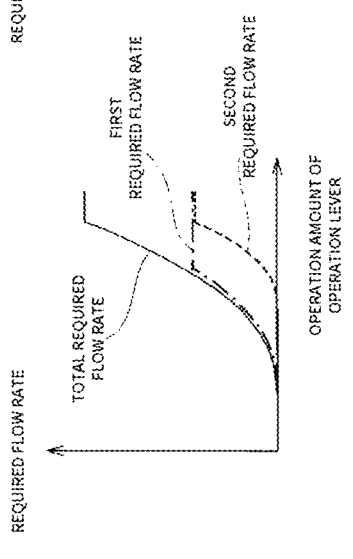
FIGS. 7(A), (B), (C) are diagrams each illustrating the relationship between operation amount of operation lever and required flow rate.
Figure 7B:
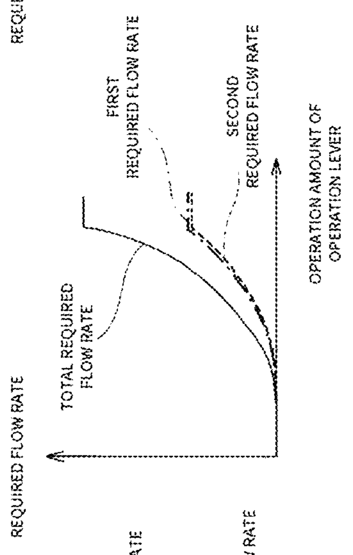
Figure 7C:
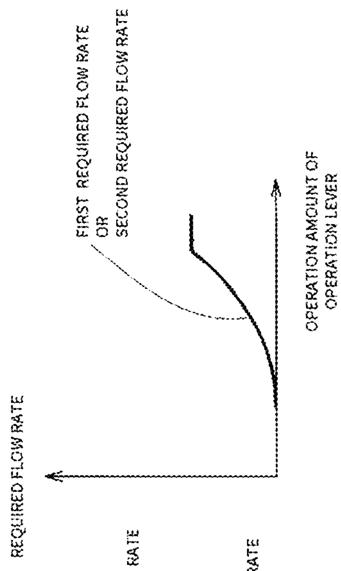

Now, FIGS. 7(A), (B), (C) illustrate relationships among option first, second operation amount of operation lever, option first, second required flow rates, and an option total required flow rate (a total of an option first required flow rate and an option second required flow rate). However, (A)

shows a case where, in the first/second operation amount setting unit 90, when operation amount of operation lever is small, only operational first operation amount is set (pressurized oil is supplied only from the first hydraulic pump A), and when operation amount of operation lever is large, option first, second operation amounts are set (pressurized oil is supplied from both the first, second hydraulic pumps A, B; (B) shows a case where option first, second operation amounts are set to the same values (the same amount of pressurized oil is supplied from the first, second hydraulic pumps A, B); and (C) shows a case where only either one of the first, second operation amounts is set (pressurized oil is supplied only from either one of the first hydraulic pump A or the second hydraulic pump B).

The required flow rate setting unit 91 is provided with data such as a map, for example, illustrating a relationship between the first, second operation amounts and the required flow rates for respective hydraulic actuators, and determines a required flow rate corresponding to operation amount of operation lever using the data. Such data is adapted to be incorporated into the required flow rate setting unit 91 as control parameters. Accordingly, for example, according to work contents that the hydraulic shovel 1 performs and the type or the specification of the option hydraulic actuator 13, values of the required flow rates corresponding to the first, second operation amounts can be changed using the monitor device or the like.

Further, the pump control unit 92 computes a target discharge flow rate of the first, second hydraulic pumps A, B in accordance with required flow rates set by the required flow rate setting unit 91. In this case, regarding the required flow rates of the boom cylinder 8, the stick cylinder 9, the bucket cylinder 10, and the slewing motor 11, there are used the boom first, second required flow rates, the stick first, second required flow rates, the bucket first required flow rate, the slewing second required flow rate which have been set by the required flow rate setting unit 91; and regarding the required flow rate of the option hydraulic actuator 13, there is used the option first, second margin-added required flow rates obtained by adding the margin flow rate a. Then, the target discharge flow rate of the first hydraulic pump A is such that a total (the boom first required flow rate+the stick first required flow rate+the bucket first required flow rate+the option first margin-added required flow rate) of the first required flow rate which operated each hydraulic actuator requires the first hydraulic pump A is taken as a target discharge flow rate. In case where a total flow rate exceeds a maximum discharge flow rate of the first hydraulic pump A, the maximum discharge flow rate is taken as the target discharge rate. Further, the target discharge flow rate of the second hydraulic pump B, similarly, is such that a total of the second required flow rate which operated each hydraulic actuator requires the second hydraulic pump B and the second margin-added required flow rate (the boom second required flow rate+the stick second required flow rate+the slewing second required flow rate+the option second required margin-added flow rate) is taken as a target discharge flow rate. In case where a total flow rate exceeds the maximum discharge flow rate of the second hydraulic pump B, the maximum discharge flow rate is taken as a target discharge flow rate. Then, the pump control unit 92 outputs control signals to the displacement varying means Aa, Ba of the first, second hydraulic pumps A, B so that the target discharge flow rate can be obtained (refer to FIG. 8). In case where the first operation amounts of respective hydraulic actuators are all "zero", in case where the second operation amounts are all "zero", the first, second hydraulic pumps A, B are controlled so that each has the minimum flow rate.

In addition, the valve opening area control unit 93 determines opening areas of the supply valve passages 23*c* to 26*c* of the boom, the stick, the bucket, the slewing control valves 23 to 26, the boom flow rate control valve 31, the first, second stick flow rate control valves 32, 33, and the supply valve passage 60*f* of the option control valve 60, in accordance with the required flow rates, which respective hydraulic actuators require the first, second hydraulic pumps A, B, determined by the required flow rate setting unit 91.

In this case, since a control process for determining opening areas of the control valves (the boom, the stick, the bucket, the slewing control valves) 23 to 26 for permanently mounted hydraulic actuators (the boom cylinder 8, the stick cylinder 9, the bucket cylinder 10, the slewing motor 11) and the flow rate control valves (the boom, first, second stick flow rate control valves) 31 to 33 is different from a control process for determining an opening area of the option control valve 60; first, the control of the opening areas of the control valves 23 to 26 of the permanently mounted hydraulic actuators and the flow rate control valves 31 to 33 will be discussed.

Upon determination of the opening areas of the control valves 23 to 26 and the flow rate control valves 31 to 33 for the permanent mounted hydraulic actuators, the valve opening area control unit 93, first, determines a distributed flow rate of each permanent hydraulic actuator. The computation of the distributed flow rate is performed separately by the first hydraulic pump A and the second hydraulic pump B. In other words, as for the distributed flow rate of the permanently mounted hydraulic actuator supplied with pressurized oil from the first hydraulic pump A, the target discharge flow rate of the first hydraulic pump A is distributed at a ratio between the option first margin-added required flow rate, the boom first required flow rate, the stick first required flow rate, the bucket first required flow rate, to determine the boom first distributed flow rate, the stick first distributed flow rate, the bucket first distributed flow rate. Also, as for the distributed flow rate of the permanently mounted hydraulic actuator supplied with pressurized oil from the second hydraulic pump B, the target discharge flow rate of the second hydraulic pump B is distributed at a ratio between the option second margin-added required flow rate, the boom second required flow rate, the stick second required flow rate, the slewing second required flow rate, to determine the boom second distributed flow rate, the stick second distributed flow rate, and the slewing second distributed flow rate. In case where the option first, second margin-added required flow rates are "zero", there is performed a distributed flow rate computation for distributing the entire rate of the target discharge flow rate to the permanently hydraulic actuators. Then, the valve opening area control unit 93 computes opening areas of the supply valve passages 23*c* to 26*c* of the boom, the stick, the bucket, the slewing control valves 23 to 26 for supplying these boom first, second distributed flow rates, the stick first, second distributed flow rates, the bucket first distributed flow rate, the slewing second distributed flow rate, respectively from the first, second hydraulic pumps A, B to the boom cylinder 8, the stick cylinder 9, the bucket cylinder 10, the slewing motor 11 and opening areas of the boom, the first, second stick flow rate control valves 31 to 33, and outputs control signals to the boom, the stick, the bucket, the slewing solenoid proportional valves 44*a*, 44*b* to 47*a*, 47*b*, the boom flow rate control solenoid proportional valve 41, the first, second stick flow rate control solenoid proportional valves 42, 43 so as to achieve the opening areas (refer to FIG. 9).

Upon controlling the opening areas of the control valves 23 to 26 and the flow rate control valves 31 to 33 for the permanently mounted hydraulic actuators, by adopting such a constitution of distributing the discharge flow rates of the first, second hydraulic pumps A, B at a ratio between the option first, second margin-added required flow rates and the required flow rate of the permanently mounted hydraulic actuator, even in case where the option hydraulic actuator 13 is combinedly operated with the other hydraulic actuators (the permanently mounted hydraulic actuators) that share the hydraulic pump A or/and B, it is configured such that the option first, second margin-added required flow rates are adapted to be supplied to the option merging oil passage 22, and thereby enabling to ensure reliably the supply flow rate to the option hydraulic actuator 13. In addition, as an example of control, it is also possible to adjust the option first, second margin-added required flow rates by multiplying the option first, second margin-added required flow rates with a flow rate limiting coefficient dedicated to combined operation, and to control so as to maintain the supply flow rate to the option hydraulic actuator 13 at a constant level.

Figure 9:
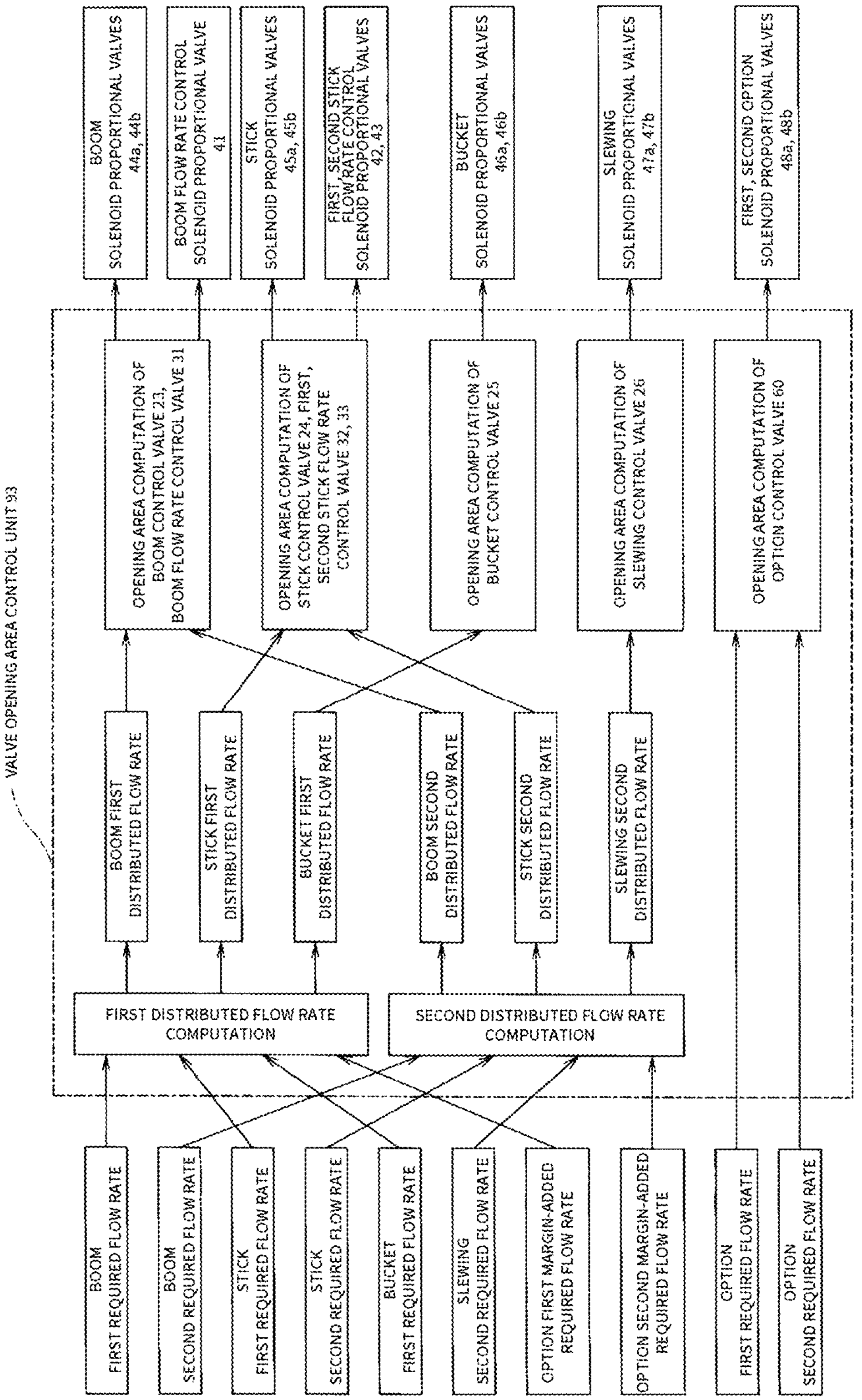
FIG. 9 is a control block diagram of a valve opening area control unit.

On the other hand, the valve opening area control unit 93, in case of determining an opening area of the option control valve 60, computes an opening area of the supply valve passage 60*f* of the option control valve 60 for supplying a total flow rate of the option first, second required flow rates which is set by the required flow rate setting unit 91 to the option hydraulic actuator 13, and to output control signals to the first, second option solenoid proportional valves 48*a*, 48*b* so as to achieve the opening area (refer to FIG. 9). In this case, the differential pressure between front and behind of the supply valve passage 60*f* of the option control valve 60 is maintained at a constant level (the predetermined pressure K) by the compensator valve 61 described above. The supply flow rate from the option control valve 60 to the option hydraulic actuator 13 is controlled with a high precision so as to be a total flow rate of the option first, second required flow rates.

Further, the bleed control unit 94 performs control of the bleed flow rate which flows from the first, second hydraulic pumps A, B to the oil tank 12, in accordance with the first, second operation amounts determined by the first/second operation amount setting unit 90; and controls the discharge pressures of the first, second hydraulic pumps A, B, by the control of the bleed flow rate.

In this case, the bleed control unit 94, firstly determines first, second required pressures (boom first required pressure, boom second required pressure, stick first required pressure, stick second required pressure, bucket first required pressure, slewing second required pressure, option first required pressure, option second required pressure) which corresponding respective hydraulic actuators require the first, second hydraulic pumps A, B, in accordance with the boom first, second operation amounts, the stick first, second operation amounts, the bucket first operation amount, the slewing second operation amount, the option first operation amount. The bleed control unit 94 is provided with, for example, data such as a map illustrating a relationship between the first, second operation amounts and the required pressures for respective hydraulic actuators; and determines the required pressures corresponding to the operation amounts of the operation levers using the data, but such data is adapted to be incorporated in the bleed control unit 94 as control parameters. The values of the required pressures corresponding to the operation amounts can be changed, according to the work contents performed by the hydraulic shovel 1 and the type and the specification of the option hydraulic actuator 13.

Subsequently, the bleed control unit 94 determines first, second pump required pressures, in accordance with the first, second required pressures. In this case, a maximum value of the required pressures (the boom first required pressure, the stick first required pressure, the bucket first required pressure, the option first required pressure) which each of the hydraulic actuators requires to the first hydraulic pump A is taken as a first pump required pressure PR1; a maximum value of the required pressures (the boom second required pressure, the stick second required pressure, the slewing second required pressure, the option second required pressure) which each of the hydraulic actuators requires to the second hydraulic pump B is taken as a second pump required pressure PR2. The maximum value of the required pressures) is taken as the second pump required pressure PR2. In accordance with these first, second pump required pressures PR1, PR2, target pressures (first, second pump target pressures) PT1 and PT2 of the first, second hydraulic pumps A, B are set (refer to FIG. 10).

Upon setting the first, second pump target pressures PT1, PT2, the bleed control unit 94, firstly determines whether or not an option operation lever is being operated; if the option operation lever is not being operated (when both the option first, second operation amounts are "zero"), the first, second pump required pressures PR1, PR2 are set as the target pressures PT1, PT2 of the first, second hydraulic pumps A, B. On the other hand, if the option operation lever is being operated (when at least one of the option first, second operation amounts is not "zero"), the bleed control unit 94 performs an option priority control described below.

In case where the bleed control unit 94 performs the option priority control, the bleed control unit 94, firstly determines whether a hydraulic pump that supplies pressurized oil to the option hydraulic actuator 13 is only the first hydraulic pump A (only the option first operation amount is set) or only the second hydraulic pump B (only the option second operation amount is set) or both the first, second hydraulic pumps A, B (the option first, second operation amounts are set). Then, the first pump required pressure PR1 and the second pump required pressure PR2 are compared, in respective cases: a case where the determination result is only the first hydraulic pump A (hereinafter referred to as a determination result (A)); a case where only the second hydraulic pump B is determined (hereinafter referred to as a determination result (B)); a case where both the first, second hydraulic pumps A, B are determined (hereinafter referred to as a determination result (A+B)).

Then, if the first pump required pressure PR1 is higher than the second pump required pressure PR2 (PR1>PR2) in the determination result (A), then these first, second pump required pressures PR1, PR2 are set as the target pressures PT1, PT2 of the second hydraulic pumps A, B, respectively. On the other hand, if the first pump required pressure PR1 is equal to or lower than the second pump required pressure PR2 (PR1≤PR2) in the determination result (A), a pressure (PR2+β) obtained by adding the margin pressure β to the second pump required pressure PR2 is taken as the first pump target pressure PT1, and the second pump required pressure PR2 is set as the second pump target pressure PT2. As a result, in the case of the determination result (A), that is, if a hydraulic pump which supplies pressurized oil to the option hydraulic actuator 13 is only the first hydraulic pump A, then the target pressure PT1 of the first hydraulic pump A is the second hydraulic pump is set to a higher pressure than the target pressure PT2 of the second hydraulic pump B. The margin pressure β is a pressure to be added in order to ensure that the discharge pressure of the hydraulic pump that supplies pressurized oil to the option hydraulic actuator 13 is always higher than the discharge pressure of the hydraulic pump that does not supply pressurized oil to the option hydraulic actuator 13.

Further, if the first pump required pressure PR1 is higher than or equal to the second pump required pressure PR2 (PR1≥PR2) in the determination result (B), then the first pump required pressure PR1 is taken as the first pump target pressure PT1, and a pressure (PR1+β) obtained by adding the margin pressure β to the first pump required pressure PR1 is set as the second pump target pressure PT2. On the other hand, if the first pump required pressure PR1 is smaller than the second pump required pressure PR2 (PR1<PR2), in the determination result (B), then these first, second pump required pressures PR1, PR2 are set as the target pressures PT1, PT2 of the first, second pumps. As a result, in the case of the determination result (B), that is, in case where a hydraulic pump that supplies pressurized oil to the option hydraulic actuator 13 is only the second hydraulic pump B, then the target pressure PT2 of the second hydraulic pump B is set so as to be higher than the target pressure PT1 of the first hydraulic pump A.

Figure 11:
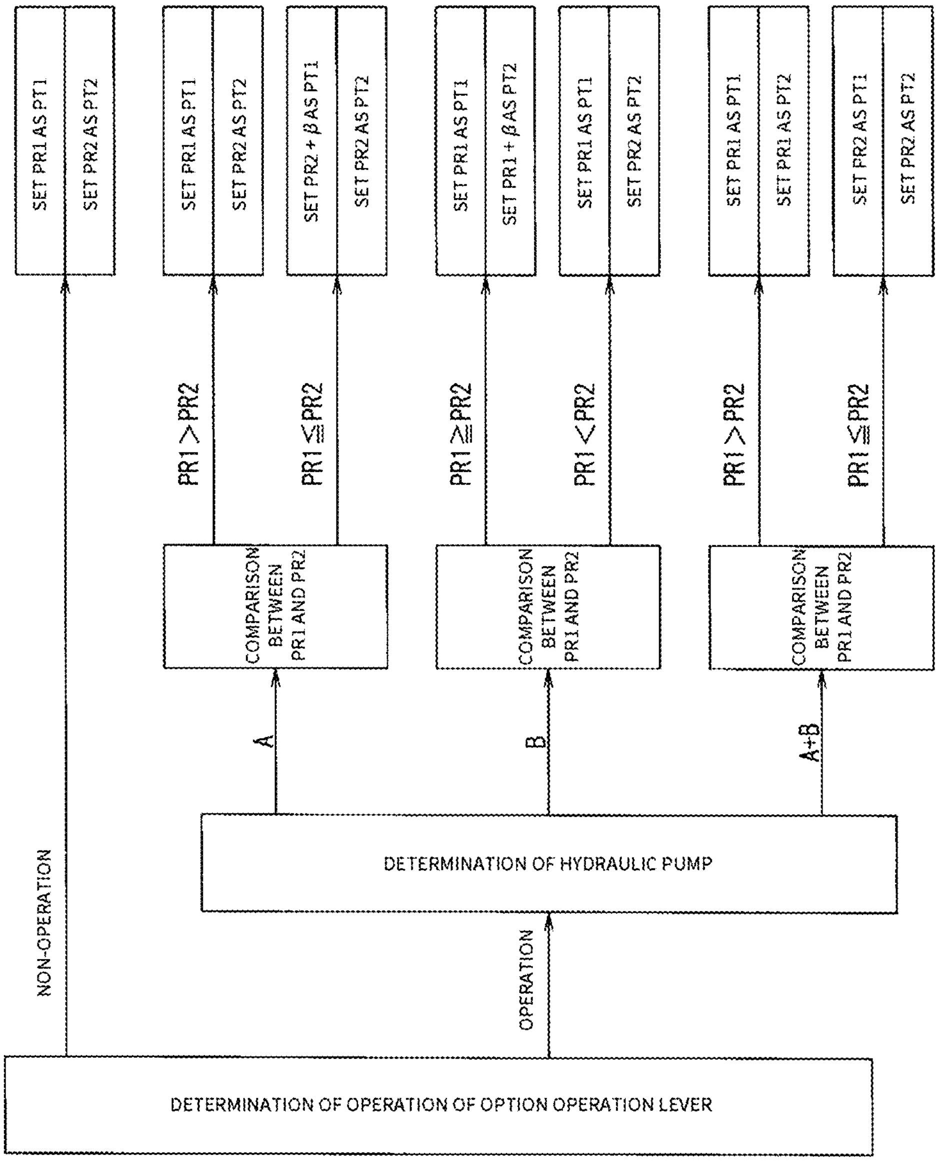
FIG. 11 is a control block diagram of first, second pump target pressure setting in the bleed control unit.

Further, if the first pump required pressure PR1 is larger than the second pump required pressure PR2 (PR1>PR2) in the determination result (C), then the first pump required pressure PR1 is set as the first, second pump target pressures PT1, PT2. On the other hand, if the first pump required pressure PR1 is less than or equal to the second pump required pressure PR2 (PR1≤PR2) in the determination result (C), then the second pump required pressure PR2 is set as the first, second pump target pressures PT1, PT2. As a result, in the case of the determination result (C), that is, if hydraulic pumps that supply pressurized oil to the option hydraulic actuator 13 are both the first, second hydraulic pumps A, B, then these target pressures PT1, PT2 of the first, second hydraulic pumps A, B are set so as to be the same pressures by matching them with the higher pressure in the first, second pump required pressures PR1, PR2 (see FIG. 11).

In this way, if a hydraulic pump that supplies pressurized oil to the option hydraulic actuator 13 is either one of the first or second hydraulic pump A, B (in the case of the determination result (A) or (B)), the discharge pressure of the one hydraulic pump that supplies the pressurized oil is controlled to be higher than the discharge pressure of the other hydraulic pump that does not supply the pressurized oil, so that the pressurized oil supplied from the one hydraulic pump preferentially is adapted to flow into the option merging oil passage 22, and the pressurized oil supplied from the other hydraulic pump not to flow into the option merging oil passage 22. On the other hand, if both the first, second hydraulic pumps A, B supply the pressurized oil to the option hydraulic actuator 13 (in the case of the determination result (A+B)), the discharge pressures of both the hydraulic pumps A, B are controlled to be the same pressures, so that the pressurized oil supplied from both the first, second hydraulic pumps A, B is adapted to be supplied and merged to the option merging oil passage 22.

Figure 10:
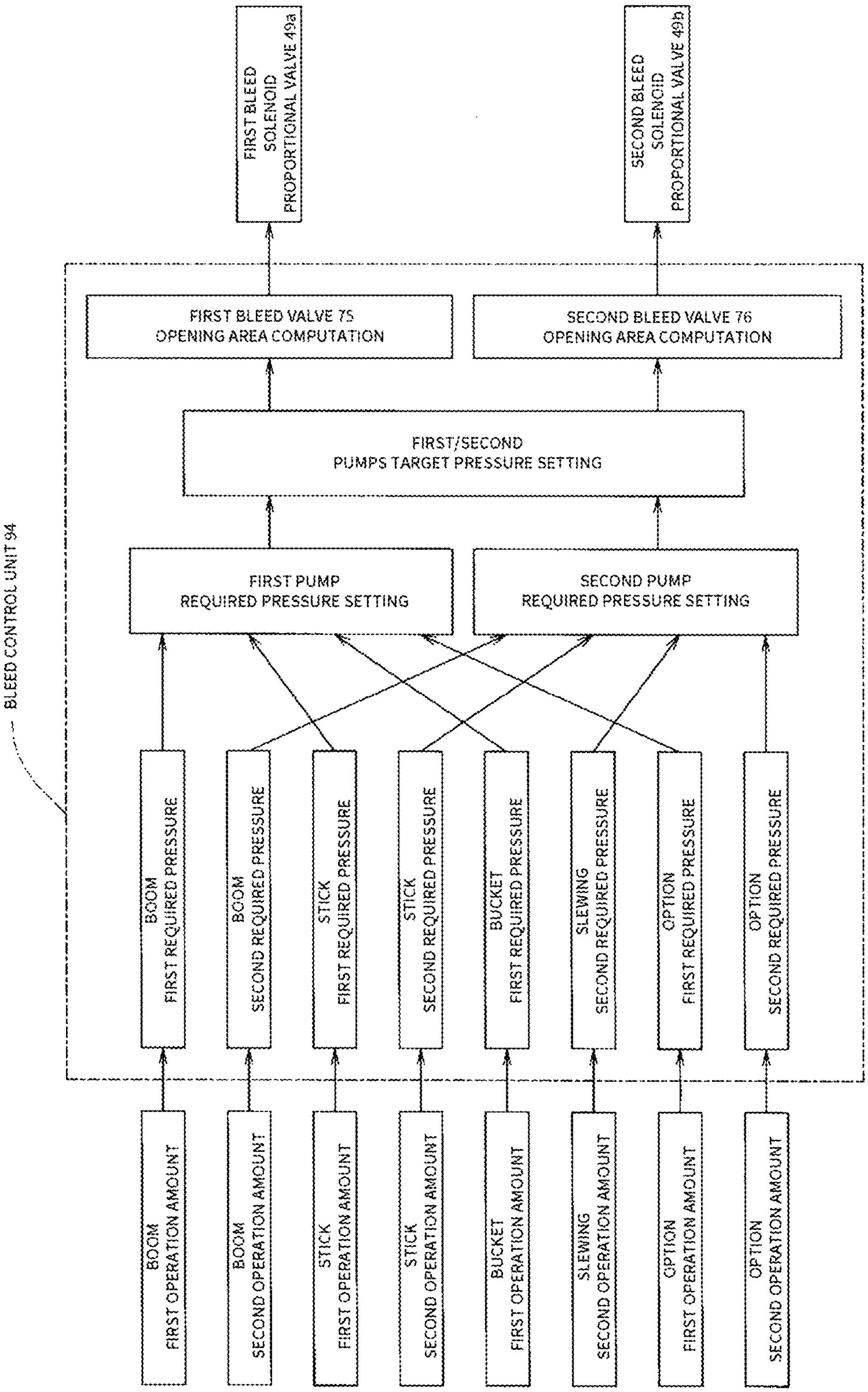
FIG. 10 is a control block diagram of a bleed control unit.

Then, the bleed control unit 94, after setting the target pressures PT1, PT2 of the first, second hydraulic pumps A, B is adapted to compute opening areas of the first, second bleed valves 75, 76 to reach the target pressures PT1, PT2; to output control signals to the first, second bleed solenoid proportional valves 49*a*, 49*b* to form opening areas; and to control the bleed flow rate flowing into the oil tank 12 from the first, second hydraulic pumps A, B (refer to FIG. 10). If all the first operation amounts of the respective hydraulic actuators are "zero", and if all the second operation amounts are "zero", then the bleed flow rate is controlled so that the discharge pressures of the first, second hydraulic pumps A, B become a preset lowest discharge pressure.

Also, the option control unit 95 performs control for setting the relief setting pressure LP of the variable relief valve 65, in accordance with information input from the option hydraulic actuator notifying means 85.

In this case, the option control unit 95 inputs from the option hydraulic actuator notifying means 85, values of the option upper limit pressure PU preset as the upper limit pressures of respective option hydraulic actuator 13 depending on the type and specification of the option hydraulic actuator 13. Then, the option control unit 95 outputs control signals to the variable relief valve 65 in order to vary the relief setting pressure LP of the variable relief valve 65 to a pressure (LP=PU−K) obtained by subtracting the predetermined pressure (the pressure specified depending on a spring 61*c* of the compensator valve 61) K from the option upper limit pressure PU. As a result, an inlet side pressure PO of the option control valve 60 is controlled to be less than or equal to PO≤(LP+K) a pressure, which is higher than the relief setting pressure LP of the variable relief valve 65 by the predetermined pressure K, (LP+K)), that is, to be less than or equal to the option upper limit pressure PU (PO≤PU), by the action of the compensator valve 61 described above. Then, by controlling the inlet side pressure of the option control valve 60 so as to be less than or equal to the option upper limit pressure PU, through the setting of the relief setting pressure LP of the variable relief valve 65 in this manner, the supply pressure to the option hydraulic actuator 13 can be less than the option upper limit pressure PU which is set depending on individual option hydraulic actuator 13, even without providing variable relief valves respectively in the pair of first, second actuator oil passages 67, 68 extending from the option control valve 60 to the option hydraulic actuator 13.

Moreover, the option control unit 95 determines whether the option hydraulic actuator 13 is a hydraulic actuator of pressurized oil supply direction is one direction like a breaker, for example, and needs to reduce the back pressure, in accordance with the information input from the option hydraulic actuator notifying means 85. If it is determined to be an applicable hydraulic actuator, then the option control unit 95 outputs a control signal to cause the switching valve 74 to be positioned at the open position X. As a result, a return oil from the option hydraulic actuator 13 to the oil tank 12 will flow directly to the oil tank 12 without passing through the option control valve 60, so that the back pressure can be reliably reduced.

Next, control performed when an option operation lever is operated, will be discussed, by illustrating Examples 1 to 7. In each Example, in case of a similar control to that in another Examples, the description will be brief or will be omitted.

EXAMPLE 1

First, a case where the option operation lever is operated independently, and the option hydraulic actuator 13 is supplied with pressurized oil only from the first hydraulic pump A will be discussed as the Example 1.

In this case, the controller 30, when an operation signal is input from the option operation detecting means 84, firstly sets an option first operation amount, which is an operation amount for which the first hydraulic pump A serves. Moreover, depending on the option first operation amount, the option hydraulic actuator 13 determines an option first required flow rate which is required to the first hydraulic pump A, and an option first margin-added required flow rate obtained by adding a margin flow rate a to the option first required flow rate. Then, the discharge flow rate control of the first hydraulic pump A is performed by taking the option first margin-added required flow rate as the target discharge flow rate. Moreover, the controller 30 sets an option first required pressure required by the option hydraulic actuator 13 of the first hydraulic pump A, depending on the option first operation amount; as well as the option first required pressure is set as a first pump required pressure PR1, moreover the first pump required pressure PR1 is set as a target pressure PT1 of the first hydraulic pump A, and an opening area of the first bleed valve 75 is controlled so as to reach the target pressure PT1. On the other hand, the discharge flow rate and discharge pressure of the second hydraulic pump B are controlled to be the lowest. Then, the pressurized oil supplied from the first hydraulic pump A flows into the option merging oil passage 22 via the first pump line C, the first option supply oil passage 17, and is supplied to the option hydraulic actuator 13 via the compensator valve 61 disposed in the option merging oil passage 22, the option control valve 60. Moreover, the controller 30 controls the supply pressure to the option control valve 60 so as to be less than or equal to the option upper limit pressure PU, by setting the setting pressure LP of the variable relief valve 65 to a pressure (LP=PU−K) obtained by subtracting the predetermined pressure K from the option upper limit pressure PU that is set according to the type and specification of the option hydraulic actuator 13. In addition, the opening area of the supply valve passage **60*f* of the option control valve 60 is controlled so as to an opening area corresponding to the option first required flow rate; but in this case, since the differential pressure between front and behind of the option control valve 60 is held at the predetermined pressure K by the compensator valve 61, a highly accurate supply flow rate control can be performed; as well as, the supply flow rate from the first hydraulic pump A is equivalent to an option first margin-added required flow rate obtained by adding the margin flow rate a to the option first required flow rate, even if the flow rate is controlled by the compensator valve 61 for purpose of differential pressure adjustment, the supply flow rate to the option control valve 60 will not come short. Moreover, in case of a hydraulic actuator where the option hydraulic actuator 13 requires reduction in back pressure, a control signal is output so that the switching valve 74 be switched to the open position X, thereby enabling to cause the return oil from the option hydraulic actuator 13 to flow into the oil tank 12 via the bypass oil passage 73 without going through the option control valve 60**.

In this manner, in the Example 1, pressurized oil is supplied to the option hydraulic actuator 13 only from the first hydraulic pump A, but in this case, the supply pressure to the option control valve 60 is controlled to be less than or equal to the option upper limit pressure PU that is set depending on individual option hydraulic actuator 13, as well as the supply flow rate to the option hydraulic actuator 13 can be controlled with a high accuracy.

EXAMPLE 2

Next, a case where an option operation lever is operated independently and pressurized oil is supplied to the option hydraulic actuator 13 from both the first, second hydraulic pumps A, B will be discussed as the Example 2.

In this case, the controller 30, when an operation signal is input from the option operation detecting means 84, firstly sets option first, second operation amounts. Moreover, the controller 30 determines option first, second required flow rates, and option first, second margin-added required flow rates, depending on the option first, second operation amounts. Then, the discharge flow rates of the first, second hydraulic pumps A, B are controlled taking the option first, second margin-added required flow rates as the target discharge flow rates. Moreover, the controller 30 sets option first, second required pressures depending on the option first, second operation amounts; as well as the option first, second required pressures are taken as the first, second pump required pressures PR1, PR2, respectively, moreover, higher pressures of these first, second pump required pressures PR1, PR2 are set as the target pressures PT1, PT2 (PT1=PT2) of both the first, second hydraulic pumps A, B, and opening areas of the first, second bleed valves 75, 76 are controlled so as to reach the target pressures PT1, PT2. As a result, the discharge pressures of the first, second hydraulic pumps A, B are controlled so as to be equalized. Then, the supply pressurized oil from the first, second hydraulic pumps A, B merges at the option merging oil passage 22 via the first, second pump lines C, D, the first, second option supply oil passages 17, 21, respectively; but in this case, since the discharge pressures of the first, second hydraulic pumps A, B are equalized, the supply oil from both the hydraulic pumps A, B flows into the option merging oil passage 22 without the supply of pressurized oil from either one of the hydraulic pumps A, B being prioritized at the time of merging, and is supplied to the option hydraulic actuator 13 via the compensator valve 61 disposed in the option merging oil passage 22, the option control valve 60. Then, the opening area of the supply valve passage **60*f* of the option control valve 60 is controlled so as to become an opening area corresponding to a total flow rate of the option first, second required flow rates; but in this case, similarly to the above-described Example 1, highly accurate supply flow rate control can be performed. Moreover, the controller 30 sets the relief setting pressure LP of the variable relief valve 65 and performs switching control of the switching valve 74** depending on necessity, but these are similar to the Example 1 and therefore description will be omitted.

Thus, in the Example 2, the option hydraulic actuator 13 is supplied with pressurized oil from both the first, second hydraulic pumps A, B. Even in this case, similarly to the Example 1, the supply pressure to the option control valve 60 is controlled so as to be less than or equal to the option upper limit pressure PU that is set depending on individual option hydraulic actuator 13; as well as the supply flow rate to the option hydraulic actuator 13 can be controlled with a high accuracy. Besides, in this case, since the discharge pressures of the first, second hydraulic pumps A, B are controlled to be equalized, and the supply oil from both the hydraulic pumps A, B can be merged into the option merging oil passage 22, without the pressurized oil supply from either one of the hydraulic pumps A, B being prioritized.

EXAMPLE 3

Next, a case where the option operation lever is being combinedly operated with the stick operation lever and the slewing operation lever, and the option hydraulic actuator 13 is supplied with pressurized oil from the first hydraulic pump A, and the stick cylinder 9 and the slewing motor 11 are supplied with pressurized oil from the second hydraulic pump B will be discussed as the Example 3.

In this case, the controller 30, when operation signals are input from the option, the stick, the slewing operation detecting means 84, 81, 83, firstly sets option first, stick second, slewing second operation amounts. Moreover, the controller 30 determines option first, stick second, slewing second required flow rates, and option first margin-added required flow rate, corresponding to the option first, stick second, slewing second operation amounts. Then, the discharge flow rate of the first hydraulic pump A is controlled taking the option first margin-added required flow rate as the target discharge flow rate, and the discharge flow rate of the second hydraulic pump B is controlled, taking a total of the stick second required flow rate and the slewing second required flow rate as the target discharge flow rate (if a total flow rate exceeds the maximum discharge flow rate of the second hydraulic pump B, then the maximum discharge flow rate is taken as the target discharge flow rate). Moreover, the controller 30 sets option first required pressure, stick second required pressure, slewing second required pressure corresponding to the option first, stick second, slewing second operation amounts. Then, the controller 30 uses the option first required pressure as the first pump required pressure PR1 and uses a higher pressure of the stick second and slewing second required pressures as the second pump required pressure PR2. Moreover, the first pump required pressure PR1 and the second pump required pressure PR2 are compared, and the target pressures PT1, PT2 of the first, second hydraulic pumps A, B are set in accordance with the comparison result; but in this case, by the control of the bleed control unit 94 described above, the target pressure PT1 of the first hydraulic pump A that supplies pressurized oil to the option hydraulic actuator 13 is set at a higher pressure than the target pressure PT2 of the second hydraulic pump B that does not supply pressurized oil to the option hydraulic actuator 13, and the opening areas of the first, second bleed valves 75, 76 are controlled so as to achieve the target pressures PT1, PT2. Then, the supply pressurized oil from the first hydraulic pump A flows into the option merging oil passage 22 via the first pump line C, the first option supply oil passage 17; but in this case, since the discharge pressure of the first hydraulic pump A is higher than the discharge pressure of the second hydraulic pump B, the supply pressurized oil from the first hydraulic pump A preferentially flows into the option merging oil passage 22, and the supply pressurized oil from the second hydraulic pump B is adapted not to flow into the option merging oil passage 22. Then, the supply pressurized oil from the first hydraulic pump A that has flowed into the option merging oil passage 22 is supplied to the option hydraulic actuator 13 via the compensator valve 61 disposed in the option merging oil passage 22, the option control valve 60. The control of opening area of the supply valve passage 60*f* of the option control valve 60 in this case, the setting of the relief setting pressure LP of the variable relief valve 65, and the switching control of the switching valve 74 performed depending on necessity are similar to the Example 1, and therefore the description thereof will be omitted. On the other hand, the supply pressurized oil from the second hydraulic pump B flows into the second stick supply oil passage 19 from the second pump line D, and is supplied to the stick cylinder 9 via the second stick flow rate control valve 33, the stick control valve 24; as well as flows into the second slewing supply oil passage 20 from the second pump line D, and is supplied to the slewing motor 11 via the slewing control valve 26. In this case, the control of opening areas of the second stick flow rate control valve 33, the supply valve passages 24*c*, 26*c* of the stick, the slewing control valves 24, 26 is performed so as to have the opening areas corresponding to the stick second distributed flow rate, the slewing second distributed flow rate, which is obtained by distributing the discharge flow rate of the second hydraulic pump B at a ratio of the stick second required flow rate, the slewing second required flow rate, by the control of the valve opening area control unit 93 described above. In the Example 3, since it is configured such that the stick cylinder 9 is supplied with pressurized oil only from the second hydraulic pump B, the first stick flow rate control valve 32 disposed in the first stick supply oil passage 16 is controlled to be closed.

Thus, in the Example 3, the option operation lever is being combinedly operated with the operation levers for the other hydraulic actuators (the stick cylinder 9, the slewing motor 11), and the option hydraulic actuator 13 is supplied with pressurized oil from the first hydraulic pump A, and the other hydraulic actuators are supplied with pressurized oil from the second hydraulic pump B. In this case as well, similarly to the Examples 1, 2, the supply pressure to the option control valve 60 is controlled so as to be less than or equal to the option upper limit pressure PU that is set depending on individual option hydraulic actuator 13; as well as the supply flow rate to the option hydraulic actuator 13 can be controlled with a high accuracy. Besides in this case, since the discharge pressure of the first hydraulic pump A that supplies pressurized oil to the option hydraulic actuator 13 is controlled to be higher than the discharge pressure of the second hydraulic pump B, only the supply pressurized oil from the first hydraulic pump A can be reliably caused to flow into the option merging oil passage 22. On the other hand, the discharge flow rate of the second hydraulic pump B is distributed to the other hydraulic actuators, thereby enabling to ensure good, combined operability between the option hydraulic actuator 13 and the other hydraulic actuators (the stick cylinder 9 the slewing motor 11).

EXAMPLE 4

Next, a case where the option operation lever is combinedly operated with the boom operation lever and the bucket operation lever, and the option hydraulic actuator 13 is supplied with pressurized oil from the second hydraulic pump B, the boom cylinder 8 and the bucket cylinder 10 are supplied with pressurized oil from the first hydraulic pump A will be described as the Example 4.

In this case, the controller 30, when operation signals are input from the option, the boom, the bucket operation detecting means 84, 80, 82, firstly sets an option second, boom first, bucket first operation amounts. Moreover, the controller 30 determines an option second, boom first, bucket first required flow rates, and an option second margin-added required flow rate, corresponding to the option second, boom first, bucket first operation amounts. Then, the discharge flow rate of the second hydraulic pump B is controlled using the option second margin-added required flow rate as the target discharge flow rate, and the discharge flow rate control of the first hydraulic pump A is performed using a total of the boom first required flow rate and the bucket first required flow rate as the target discharge flow rate (using the maximum discharge flow rate as the target discharge flow rate if a total flow rate exceeds the maximum discharge flow rate of the first hydraulic pump A). Moreover, the controller 30 sets the option second, the boom first, the bucket first required pressures depending on the option second, the boom first, the bucket first operation amounts. Then, the second required pressure for the option is taken as a second pump required pressure PR2, and a higher pressure of the boom first required pressure, the bucket first required pressure is taken as a first pump required pressure PR1. Further, the first pump required pressure PR1 and the second pump required pressure PR2 are compared, and the target pressures PT1, PT2 of the first, second hydraulic pumps A, B are set in accordance with the comparison result; but in this case, by the control of the bleed control unit 94 described above, the target pressure PT2 of the second hydraulic pump B that supplies pressurized oil to the option hydraulic actuator 13 is set at a higher pressure than the target pressure PT1 of the first hydraulic pump A that does not supply pressurized oil to the option hydraulic actuator 13, and opening areas of the first, second bleed valves 75, 76 are controlled so as to achieve the target pressures PT1 and PT2. Then, the supply pressurized oil from the second hydraulic pump B flows into the option merging oil passage 22 via the second pump line D, the second option supply oil passage 21. In this case, however, since the discharge pressure of the second hydraulic pump B is higher than the discharge pressure of the first hydraulic pump A, the supply pressurized oil from the second hydraulic pump B preferentially flows into the option merging oil passage 22, and the supply pressurized oil from the first hydraulic pump A is adapted not to flow into the option merging oil passage 22. Then, the supply pressurized oil from the second hydraulic pump B that has flowed into the option merged oil passage 22 is supplied to the option hydraulic actuator 13 via the compensator valve 61, the option control valve 60 disposed in the option merging oil passage 22. The control of opening area of the supply valve passage 60*f* of the option control valve 60 in this case, the setting of the relief setting pressure LP of the variable relief valve 65, and the switching control of the switching valve 74 performed depending on necessity are similar to the Example 1, and therefore the description thereof will be omitted. On the other hand, the supply pressurized oil from the first hydraulic pump A flows into the first boom supply oil passage 14 from the first pump line C and is supplied to the boom cylinder 8 via the boom control valve 23; as well as flows into the first bucket supply oil passage 15 from the first pump line C and is supplied to the bucket cylinder 10 via the bucket control valve 25. In this case, the control of opening areas of the supply valve passages 23*c*, 25*c* of the boom, the bucket control valves 23, 25 is performed so as to have opening areas corresponding to the boom first distributed flow rate, the bucket first distributed flow rate obtained by distributing the discharge flow rate of the first hydraulic pump A at a ratio of the boom first required flow rate, the bucket first required flow rate. In the Example 4, since it is configured such that the boom cylinder 8 is supplied with pressurized oil only from the first hydraulic pump A, the boom flow rate control valve 31 disposed in the second boom supply oil passage 18 is controlled to close.

In this manner, in the Example 4, the option operation lever is combinedly operated with the operation levers for the other hydraulic actuators (the boom cylinder 8, the bucket cylinder 10), and the option hydraulic actuator 13 is supplied with pressurized oil from the second hydraulic pump B, and the other hydraulic actuators are supplied with pressurized oil from the first hydraulic pump A; but in this case also, similarly to the Examples 1 to 3, the supply pressure to the option control valve 60 is controlled so as to be less than or equal to the option upper limit pressure PU that is set depending on an individual option hydraulic actuator 13, as well as the supply flow rate to the option hydraulic actuator 13 can be controlled with a high accuracy. Besides, in this case, since the discharge pressure of the second hydraulic pump B that supplies pressurized oil to the option hydraulic actuator 13 is controlled to be higher than the discharge pressure of the first hydraulic pump A, only the supply pressurized oil from the second hydraulic pump B can be reliably caused to flow into the option merging oil passage 22. On the other hand, the discharge flow rate of the first hydraulic pump A is distributed to the other hydraulic actuators, thereby enabling to ensure good, combined operability between the option hydraulic actuator 13 and the other hydraulic actuators (the boom cylinder 8, the bucket cylinder 10).

EXAMPLE 5

Next, a case where the option operation lever is combinedly operated with the boom operation lever, the stick operation lever and the bucket operation lever, and the option hydraulic actuator 13 is supplied with pressurized oil from the second hydraulic pump B; the boom cylinder 8, the stick cylinder 9 and the bucket cylinder 10 are supplied with pressurized oil from the first hydraulic pump A will be discussed as Example 5.

In this case, the controller 30, when operation signals are input from the option, the boom, the stick, the bucket operation detecting means 84, 80, 81, 82, firstly detects an option second, boom first, stick first, bucket first operation amounts. Moreover, the controller 30 determines an option second, boom first, stick first, bucket first required flow rates, and an option second margin-added required flow rate, depending on the option second, the boom first, the stick first, the bucket first operation amounts. Then, the discharge flow rate of the second hydraulic pump B is controlled taking the option second margin-added required flow rate as the target discharge flow rate, and the discharge flow rate of the first hydraulic pump A is controlled taking a total of the boom first required flow rate, the stick first required flow rate and the bucket first required flow rate as the target discharge flow rate (if a total flow rate exceeds the maximum discharge flow rate of the first hydraulic pump A, then the maximum discharge flow rate is taken as the target discharge flow rate). Moreover, the controller 30 sets option second, boom first, stick first, bucket first required pressures depending on the option second, the boom first, the stick first, the bucket first operation amounts. Then, the option second required pressure is taken as the second pump required pressure PR2, and the highest pressure among the boom first, the stick first, the bucket first required pressures is taken as the first pump required pressure PR1. Moreover, similarly to the Example 4, the target pressures PT1, PT2 of the first, second hydraulic pumps A, B are set and opening areas of the first, second bleed valves 75, 76 are controlled to reach the target pressures PT1, PT2. In this case, the target pressure PT2 of the second hydraulic pump B that supplies pressurized oil to the option hydraulic actuator 13 is also set to a higher than the target pressure PT1 of the first hydraulic pump A that does not supply pressurized oil to the option hydraulic actuator 13. The supply pressurized oil from the second hydraulic pump B flows into the option merging oil passage 22 via the second pump line D, the second option supply oil passage 21. In this case, similarly to the Example 4, the supply pressurized oil from the second hydraulic pump B preferentially flows into the option merging oil passage 22, and the supply pressurized oil from the first hydraulic pump A is adapted not to flow thereinto. Then, the supply pressurized oil from the second hydraulic pump B that has flowed into the option merging oil passage 22 is supplied to the option hydraulic actuator 13 via the compensator valve 61 and the option control valve 60; but the control of the opening area of the supply valve passage **60*f* of the option control valve 60 in this case, the setting of the relief setting pressure LP of the variable relief valve 65, the switching control of the switching valve 74 performed depending on necessity are similar to the Example 1, and therefore the description thereof will be omitted. On the other hand, the supply pressurized oil from the first hydraulic pump A flows into the first boom supply oil passage 14 from the first pump line C, and is supplied to the boom cylinder 8 via the boom control valve 23; as well as flows into the first stick supply oil passage 16 from one pump line C, is supplied to the stick cylinder 9 via the first stick flow rate control valve 32, the stick control valve 24, and further flows into the first bucket supply oil passage 15 from the first pump line C, and is supplied to the bucket cylinder 10 via the bucket control valve 25. The control of opening areas of the supply valve passages 23*c*, 24*c*, 25*c*, the first stick flow rate control valve 32 of the boom, the stick, the bucket control valves 23, 24, 25 in this case is performed so as to have opening areas corresponding to a boom first distributed flow rate, a stick first distributed flow rate, a bucket first distributed flow rate obtained, by distributing the discharge flow rate of the first hydraulic pump A at a ratio of the boom first required flow rate, the stick first required flow rate, the bucket first required flow rate, by the control of the above-described valve opening area control unit 93. In the Example 5, since it is configured such that the boom cylinder 8, the stick cylinder 9 are supplied with pressurized oil only from the first hydraulic pump A, the boom flow rate control valve 31 disposed in the second boom supply oil passage 18, the second stick flow rate control valve 33 disposed in the second stick supply oil passage 19** are controlled to close.

In this manner, in the Example 5, the option operation lever is combinedly operated with the operation levers for the other hydraulic actuators (the boom cylinder 8, the stick cylinder 9, the bucket cylinder 10), and the option hydraulic actuator 13 is supplied with pressurized oil from the second hydraulic pump B, and the other hydraulic actuators are supplied with pressurized oil from the first hydraulic pump A; but in this case as well, similarly to the Examples 1 to 4, the supply pressure to the option control valve 60 is controlled to be less than or equal to the option upper limit pressure PU that is set depending on an individual option hydraulic actuator 13; as well as the supply flow rate to the option hydraulic actuator 13 can be controlled with a high accuracy. Besides, similarly to the Example 4, only the pressurized oil supplied from the second hydraulic pump B can be reliably caused to flow into the option merging oil passage 22; as well as good, combined operability with the option hydraulic actuator 13 and the other hydraulic actuators (the boom cylinder 8, the stick cylinder 9, the bucket cylinder 10)) can be ensured. Then, like the Example 5, with a configuration where the option hydraulic actuator 13 is supplied with pressurized oil from either one hydraulic pump of the first, second (the second hydraulic pump B in the Example 5), and the boom cylinder 8, the stick cylinder 9, the bucket cylinder 10 are supplied with pressurized oil from the other hydraulic pumps (the first hydraulic pump A in Example 5), even if the option hydraulic actuator 13 is an hydraulic actuator that requires most of the discharge flow rate for one hydraulic pump, it is possible to adopt a configuration in which pressurized oil is supplied only from the one hydraulic pump.

EXAMPLE 6

Next, a case in which the option operation lever is combinedly operated with the boom operation lever, the slewing operation lever, and the option hydraulic actuator 13 and the boom cylinder 8 are supplied with pressurized oil from the first hydraulic pump A, and the slewing motor 11 is supplied with pressurized oil from the second hydraulic pump B will be discussed as Example 6.

In this case, the controller 30, when operation signals are input from the option, the boom, the slewing operation detecting means 84, 80, 83, firstly sets an option first, boom first, slewing second operation amounts. Moreover, the controller 30 determines an option first, boom first, slewing second required flow rate, and an option first margin-added required flow rate, depending on the option first, boom first, slewing second operation amounts. Then, the discharge flow rate control of the first hydraulic pump A is performed taking a total of the option first margin-added required flow rate and the boom first required flow rate as the target discharge flow rate (taking the maximum discharge flow rate as the target discharge flow rate, if a total flow rate exceeds the maximum discharge flow rate of the first hydraulic pump A), (as the flow rate), and the discharge flow rate control of the second hydraulic pump B is performed taking the slewing second required flow rate as the target discharge flow rate. Moreover, the controller 30 sets an option first, boom first, slewing second required pressure, depending on the option first, the boom first, slewing second operation amounts. Then, a higher pressure of the option first, boom first required pressures is taken as the first pump required pressure PR1, and the slewing second required pressure is taken as the second pump required pressure PR2. Moreover, the first pump required pressure PR1 and the second pump required pressure PR2 are compared, and the target pressures PT1, PT2 of the first, second hydraulic pumps A, B are set in accordance with the comparison result; but in this case, by the control of the bleed control unit 94 described above, the target pressure PT1 of the first hydraulic pump A that supplies pressurized oil to the option hydraulic actuator 13 is set at a higher pressure than the target pressure PT2 of the second hydraulic pump B that does not supply pressurized oil to the option hydraulic actuator 13, and the opening areas of the first, second bleed valves 75, 76 are controlled so as to achieve the target pressures PT1, PT2. The supply pressurized oil from the first hydraulic pump A flows into the first boom supply oil passage 14 from the first pump line C, is supplied to the boom cylinder 8 via the boom control valve 23; as well as flows into the option merging oil passage 22 from the first pump line C via the first option supply oil passage 17; but in this case, since the discharge pressure of the first hydraulic pump A is a higher pressure than the discharge pressure of the second hydraulic pump B, the supply pressurized oil from the first hydraulic pump A preferentially flows into the option merging oil passage 22, and the supply pressurized oil from the second hydraulic pump B is adapted not to flow into the option merging oil passage 22. The pressurized oil from the first hydraulic pump A which has been supplied from the first boom supply oil passage 14 to the boom control valve 23 is controlled such that the boom cylinder 8 is controlled in accordance with an opening area of the supply valve passage **23*c* of the boom control valve 23; but in this case, by the control of the above-described valve opening area control unit 93, an opening area of the supply valve passage 23***c* of the boom control valve 23 is controlled so as to be an opening area corresponding to the boom first distributed flow rate obtained by distributing the discharge flow rate of the first hydraulic pump A at a ratio of the option first margin-added required flow rate, the boom first required flow rate. As a result, the flow rate that flows into the option merging oil passage 22 from the first hydraulic pump A is the option first margin-added required flow rate obtained by adding the margin flow rate a to the option first required flow. Then, the supply pressurized oil from the first hydraulic pump A that has flowed into the option merging oil passage 22 is supplied to the option hydraulic actuator 13 via the compensator valve 61, the option control valve 60 disposed in the option merging oil passage 22. In this case, an opening area of the supply valve passage 60*f* of the option control valve 60 is controlled so as to correspond to the option first required flow rate. The control of the opening area, the setting of the relief setting pressure LP of the variable relief valve 65, the action of the compensator valve 61, the switching control of the switching valve 74 performed depending on necessity are similar to those in the Example 1, and thus the description thereof will be omitted. On the other hand, the supply pressurized oil from the second hydraulic pump B flows into the second slewing supply oil passage 20 from the second pump line D and is supplied to the slewing motor 11 via the slewing control valve 26. The control of an opening area of the supply valve passage 26*c* of the slewing control valve 26 of this case is performed so as to be an opening area corresponding to the slewing second required flow rate, because a hydraulic actuator supplied with pressurized oil from the second hydraulic pump B is only the slewing motor 11. In the Example 6, since it is configured such that the boom cylinder 8 is supplied with pressurized oil only from the first hydraulic pump A, the boom flow rate control valve 31 disposed in the second boom supply oil passage 18 is controlled to close.

In this manner, in the Example 6, the option operation lever is combinedly operated with the operation lever for the two other hydraulic actuators (the boom cylinder 8, the slewing motor 11), and the option hydraulic actuator 13 and the one of the other hydraulic actuators are supplied with pressurized oil from the first hydraulic pump A, and the other of the other hydraulic actuators is supplied with pressurized oil from the second hydraulic pump B; but in a case where the option hydraulic actuator 13 shares the other hydraulic actuator and the first hydraulic pump A in this manner, since the option first margin-added required flow rate obtained by adding the margin flow rate a to the option first required flow rate is supplied to the option merging oil passage 22, the supply flow rate to the option control valve 60 does not come short even when the flow rate is controlled for purpose of differential pressure adjustment by the compensator valve 61; then also in this case, similarly to the Examples 1 to 5, the supply pressure to the option control valve 60 is controlled to be less than or equal to the option upper limit pressure PU that is set depending on an individual option hydraulic actuator 13; as well as the supply flow rate to the option hydraulic actuator 13 can be controlled with a high accuracy. Besides in this case, since the discharge pressure of the first hydraulic pump A that supplies pressurized oil to the option hydraulic actuator 13 is controlled to be higher than the discharge pressure of the second hydraulic pump B, only the supply pressurized oil from the first hydraulic pump A can be reliably caused to flow into the option merging oil passage 22. On the other hand, the discharge flow rate of the second hydraulic pump B is supplied to the other of the other hydraulic actuators, thus ensuring good, combined operability between the option hydraulic actuator 13 and the other hydraulic actuators (the boom cylinder 8, the slewing motor 11).

EXAMPLE 7

Next, a case where the option operation lever is combinedly operated with the boom operation lever, the stick operation lever, and the option hydraulic actuator 13 and the stick cylinder 9 are supplied with pressurized oil from the second hydraulic pump B, and the boom cylinder 8 is supplied with pressurized oil from the first hydraulic pump A will be discussed as the Example 7.

In this case, the controller 30, when operation signals are input from the option, the stick, the boom operation detecting means 84, 81, 80, firstly sets an operational second, stick second, boom first operation amounts. Moreover, the controller 30 determines an option second, stick second, boom first required flow rates, and an option second margin-added required flow rate, depending on the operational second, stick second, boom first operation amounts. Then, the discharge flow rate control of the second hydraulic pump B is performed taking a total of the option second margin-added required flow rate and the stick second required flow rate as the target discharge flow rate (taking the maximum discharge flow rate as the target discharge flow rate, if a total flow rate exceeds the maximum discharge flow rate of the second hydraulic pump B), and the discharge flow rate of the first hydraulic pump A is controlled taking the boom first required flow rate as the target discharge flow rate. Moreover, the controller 30 sets an option second, stick second, boom first required pressure depending on the option second, stick second, boom first operation amounts. Then, a higher pressure of the option second required pressure, the stick second required pressure is taken as the second pump required pressure PR2, and the boom first required pressure is taken as the first pump required pressure PR1. Further, the first pump required pressure PR1 and the second pump required pressure PR2 are compared, and the target pressures PT1, PT2 of the first, second hydraulic pumps A, B are set in accordance with the comparison result; but in this case, by the control of the bleed control unit 94 described above, the target pressure PT2 of the second hydraulic pump B that supplies pressurized oil to the option hydraulic actuator 13 is set at a higher pressure than the target pressure PT1 of the first hydraulic pump A that does not supply pressurized oil to the option hydraulic actuator 13, and opening areas of the first, second bleed valves 75, 76 are controlled so as to achieve the target pressures PT1 and PT2. Then, the pressurized oil supplied from the second hydraulic pump B flows into the second stick supply oil passage 19 from the second pump line D, and is supplied to the cylinder 9 via the second stick flow rate control valve 33, the stick control valve 24; as well as flows into the option merging oil passage 22 from the second pump line D via the second option supply oil passage 21; but in this case, since the discharge pressure of the second hydraulic pump B is higher than the discharge pressure of the first hydraulic pump, the pressurized oil supplied from the second hydraulic pump B preferentially flows into the option merging oil passage 22, and the pressurized oil supplied from the first hydraulic pump A is adapted not to flow into the option merging oil passage 22. Then, the discharge oil of the second hydraulic pump B supplied to the stick control valve 24 via the second stick flow rate control valve 33 from the second stick supply oil passage 19 is such that the supply flow rate to the stick cylinder 9 is controlled in accordance with opening areas of the second stick flow rate control valve 33 and the supply valve passage 24*c* of the stick control valve 24; but in this case, opening areas of the second stick flow rate control valve 33, the supply valve passage 24*c* of the stick control valve 24 are controlled so as to be an opening area corresponding to the stick second distributed flow rate obtained by distributing the discharge flow rate of the second hydraulic pump B at a ratio of the option second margin-added required flow rate, the stick second required flow rate, by the control of the valve opening area control unit 93 described above. As a result, the option second margin-added required flow rate obtained by adding the margin flow rate a to the option second required flow rate flows into the option merging oil passage 22 from the second hydraulic pump B. Then, the supply pressurized oil from the second hydraulic pump B that has flowed into the option merging oil passage 22 is supplied to the option hydraulic actuator 13 via the compensator valve 61 and the option control valve 60 disposed in the option merging oil passage 22. In this case, an opening area of the supply valve passage 60*f* of the option control valve 60 is controlled so as to correspond to the option second required flow rate. The control of the opening area, the setting of the relief setting pressure LP of the variable relief valve 65, the action of the compensator valve 61, the switching control of the switching valve 74 performed depending on necessity are similar to those in the Example 1, and thus the description thereof will be omitted. On the other hand, the supply pressurized oil from the first hydraulic pump A flows into the first boom supply oil passage 14 from the first pump line C and is supplied to the boom cylinder 8 via the boom control valve 23. The control of the opening area of the supply valve passage 23*c* of the boom control valve 23 of this case is controlled so as to be an opening area corresponding to the boom first required flow rate, since a hydraulic actuator supplied with pressurized oil from the first hydraulic pump A. is only the boom cylinder 8. In the Example 7, since it is configured such that the boom cylinder 8 is supplied with pressurized oil only from the first hydraulic pump A, the boom flow rate control valve 31 disposed in the second boom supply oil passage 18 is controlled to close. Also, since it is configured such that the stick cylinder 9 is supplied with pressurized oil only from the second hydraulic pump B, the first stick flow rate control valve 32 disposed in the first stick supply oil passage 16 is controlled to close.

In this manner, in the Example 7, the option operation lever is combinedly operated with the operation levers for the two other hydraulic actuators (the stick cylinder 9, the boom cylinder 8), and the option hydraulic actuator 13 and the one of the other hydraulic actuators are supplied with pressurized oil from the second hydraulic pump B, and the other of the other hydraulic actuators pressurized oil is supplied with pressurized oil from the first hydraulic pump A; but even in a case where the option hydraulic actuator 13 shares the other hydraulic actuators and the second hydraulic pump B in this manner, since the option first margin-added required flow rate obtained by adding the margin flow rate a to the option first required flow rate is supplied to the option merging oil passage 22, even when the flow rate control is performed for purpose of the differential pressure adjustment by the compensator valve 61, the supply flow rate to the option control valve 60 does not come short, then in this case also, similarly to the Examples 1 to 6, the supply pressure to the option control valve 60 is controlled to be less than or equal to the option upper limit pressure PU that is set depending on an individual option hydraulic actuator 13; as well as the supply flow rate to the option hydraulic actuator 13 can be controlled with a high accuracy. Besides, in this case, since the discharge pressure of the second hydraulic pump B that supplies pressurized oil to the option hydraulic actuator 13 is controlled to be higher than the discharge pressure of the first hydraulic pump A, only the supply pressurized oil from the second hydraulic pump B can be reliably caused to flow into the option merging oil passage 22. On the other hand, the discharge flow rate of the first hydraulic pump A is supplied to the other of the other hydraulic actuators, thus ensuring good, combined operability between the option hydraulic actuator 13 and the other hydraulic actuators (the stick cylinder 9, the boom cylinder 8).

In the present embodiment configured as described above, a hydraulic control system for a hydraulic shovel 1 includes the first, second hydraulic pumps A, B; the option hydraulic actuator 13 selectively mounted on the hydraulic shovel 1, whose hydraulic supply source is either one or both of these first, second hydraulic pumps A, B; the boom cylinder 8, the stick cylinder 9, the bucket cylinder 10, the slewing motor 11 (other hydraulic actuators) whose hydraulic supply source is either one or both of these first, second hydraulic pumps A, B; as well as there are provided therein, the first, second option supply oil passages 17, 21 connected to the first, second hydraulic pumps A, B respectively, and acting as pressurized oil supply source to the option hydraulic actuator 13; the first, second boom supply oil passages 14, 18, the first, second stick supply oil passages 16, 19, the first bucket supply oil passage 15, the second slewing supply oil passage 20 (the first, second other hydraulic actuators supply oil passages) connected to the first, second hydraulic pumps A, B respectively, and acting as pressurized oil supply passages to the boom cylinder 8, the stick cylinder 9, the bucket cylinder 10, the slewing motor 11; the option merging oil passage 22 that allows the first, second option supply oil passages 17, 21 to be merged thereinto; the option control valve 60 that performs oil supply and discharge control to and from the option hydraulic actuator 13; the boom, the stick, the bucket, the slewing control valves 23 to 26 (the other hydraulic actuators control valves) that perform oil supply and discharge control to and from the boom cylinder 8, the stick cylinder 9, the bucket cylinder 10, the slewing motor 11 respectively; the controller 30 for controlling these option control valve 60 and the boom, the stick, the bucket, and the slewing control valves 23 to 26. In the hydraulic control system, the option merging oil passage 22 is provided with the option control valve 60 and the compensator valve 61, which is disposed on an upstream side of the option control valve 60, by introducing an inlet side pressure and an outlet side pressure of the option control valve 60, operates in order to maintain, a differential pressure between the introduced inlet side pressure and the outlet side pressure at the predetermined pressure K; as well as by connecting the variable relief valve 65 capable of varying the relief setting pressure LP in response to a control signal from the controller 30 to a signal pressure introduction oil passage 62 that introduces the outlet side pressure of the option control valve 60 to the compensator valve 61, and lowering the pressure of the signal pressure introduction oil passage 62 down to the relief setting pressure LP by the variable relief valve 65 and introducing it to the compensator valve 61, the pressure of the option merging oil passage 22 on the inlet side of the option control valve 60 can be variably controlled in accordance with the control signal that is output from the controller 30 to the variable relief valve 65.

As a result, the upper limit pressure of the pressurized oil which is flow rate controlled by the option control valve 60 and is supplied to the option hydraulic actuator 13 will be able to be variably controlled so as to become a pressure corresponding to an individual option hydraulic actuator 13, by changing the relief setting pressure LP of the variable relief valve 65 connected signal pressure introduction oil passage 62 in accordance with the control signal from the controller 30; and thus compared to the hydraulic control system that is configured to dispose variable relief valves respectively in a pair of first, second hydraulic actuator oil passages 67, 68 extending to the option hydraulic actuator 13 from the option control valve 60, and to variably control the upper limit pressure of the supply pressurized oil to the option hydraulic actuator 13, the variable relief valves can be reduced, thereby enabling contribution to cost reduction. Besides, since the differential pressure between the inlet side pressure and the outlet side pressure of the option control valve 60 is maintained at the predetermined pressure K by the compensator valve 61, the supply flow rate to the option hydraulic actuator 13 can be controlled with a high accuracy.

Moreover, the hydraulic control system includes the first, second bleed valves 75, 76 for controlling bleed flow rate that flows into the oil tank 12 from the first, second hydraulic pumps A, B respectively in accordance with control signals output from the controller 30, and is configured such that the discharge pressure of the first, second hydraulic pumps A, B is controlled by the bleed flow rate control by the first, second bleed valves 75, 76; but in this case, the controller 30, in case where the option hydraulic actuator 13 whose hydraulic supply source is only one of the first, second hydraulic pumps A, B, causes the discharge pressure of the one of the hydraulic pumps acting as the hydraulic supply source to be higher than the discharge pressure of the other hydraulic pump not acting as the hydraulic supply source, and in case where the option hydraulic actuator 13 whose hydraulic supply source is both the first, second hydraulic pumps A, B, performs bleed flow rate control so that the discharge pressures of the second hydraulic pumps A, B to be equalized. As a result, in case where the option hydraulic actuator 13 whose hydraulic supply source is only one of the first, second hydraulic pumps A, B, the supply pressurized oil from the one hydraulic pump acting as the hydraulic supply source can be caused preferentially to flow into the option merging oil passage 22, and thus, the supply pressurized oil of the another hydraulic pump that is not a hydraulic supply source does not flow into the option merging oil passage 22, and in case where the option hydraulic actuator 13 whose pressure supply source is both of the first, second hydraulic pumps A, B, the supply pressurized oil from both the first, second hydraulic pumps A, B will be caused to be merged into the option merging oil passage 22; and therefore, even if the first, second option supply oil passages 17, 21 are not provided with valves for opening and closing the oil passages 17, 21 respectively, in both cases where either one of the first, second hydraulic pumps A, B acts the hydraulic supply source, and where both hydraulic pumps act as the hydraulic supply sources, only the supply pressurized oil from the hydraulic pump acting as the hydraulic supply source can be supplied to the option merging oil passage 22, thereby enabling reduction of the number of parts, and contribution to cost reduction.

Moreover, the controller 30 also performs discharge flow rate control of the first, second hydraulic pumps A, B; but in this case, the controller 30 determines option first, second required flow rates; boom first, second required flow rates; stick first, second required flow rates; bucket first required flow rate; slewing second required flow rate; and option first, second margin-added required flow rates obtained by adding a margin flow rate for purpose of differential pressure adjustment of the compensator valve 61 to the option first, second required flow rates, which respective hydraulic actuators require of the first, second hydraulic pumps A, B respectively depending on the option, the boom, the stick, the bucket, the slewing operation amounts of operation levers; and controls discharge flow rates of the first, second hydraulic pumps A, B in accordance with these required flow rates; as well as in case where the boom cylinder 8, the stick cylinder 9, the bucket cylinder 10, and the slewing motor 11 are operated, the boom first, second required flow rates; the stick first, second required flow rates; the bucket first required flow rate; and the slewing second required flow rate for will be used as the required flow rates; on the other hand, in case where the option hydraulic actuator 13 is operated, the option first, second margin-added required flow rates will be used as the required flow rate. As a result, the discharge flow rate control of the first, second hydraulic pumps A, B can be performed depending on the operation amount of the operation lever; as well as, in case where the option hydraulic actuator 13 is operated, first, second margin-added required flow rates obtained by adding the margin flow rate a for purpose of differential pressure adjustment to the first, second required flow rates which the option hydraulic actuator 13 requires can be secured as pump flow rates for the option hydraulic actuator 13.

Further, the controller 30 can control opening areas of the option control valve 60, the boom, the stick, the bucket, the slewing control valves 23 to 26 respectively, in accordance with the option first, second required flow rates; the boom first; second required flow rates; the stick first; second required flow rates; the bucket first required flow rates; the slewing second required flow rate; and the option first, second margin-added required flow rates obtained by adding the margin flow rate a to the option first, second required flow rates; but in this case, the controller 30 controls, as for the option control valve 60, its opening area so that a total flow rate obtained by adding up the option first, second required flow rates be supplied to the option hydraulic actuator 13. On the other hand, as for the boom, the stick, the bucket, the slewing control valves 23 to 26, the controller 30 determines boom first, second distributed flow rate; stick first, second distributed flow rates; bucket first distributed flow rate; slewing second distributed flow rate obtained by distributing the discharge flow rates of the first, second hydraulic pumps A, B in proportion to the option first, second margin-added required flow rates; the boom first, second required flow rates; the stick first, second required flow rates; the bucket first required flow rate; the slewing second required flow rate, and will control their opening areas so that a total flow rate obtained by adding up the first, second distributed flow rates be supplied to the boom cylinder 8, the stick cylinder 9, the bucket cylinder 10, and the slewing motor 11. As a result, even if the option hydraulic actuator 13 is combinedly operated with other hydraulic actuators (the boom cylinder 8, the stick cylinder 9, the bucket cylinder 10, the slewing motor 11) that share the hydraulic pumps A or/and B, the option first, second margin-added required flow rates will be supplied to the option merging oil passage 22, thereby enabling to secure reliably the supply flow rate to the option hydraulic actuator 13. Consequently, in a case where for example, the option hydraulic actuator 13 is a hydraulic actuator that requires a constant flow rate, malfunctions such as insufficient supply flow to the option hydraulic actuator 13 at the time of combined operation with the other hydraulic actuators can be reliably avoided, as a good, combined operability with the other hydraulic actuators can be ensured.

INDUSTRIAL APPLICABILITY

The present invention can be utilized for a hydraulic control system, in a working machine such as a hydraulic shovel, in case where an option hydraulic actuator is mounted on the working machine.

The invention claimed is:

1. A hydraulic control system in a working machine equipped with first, second hydraulic pumps; an option hydraulic actuator, which is selectively mounted to the working machine, whose hydraulic supply source is either one or both of the first, second hydraulic pumps; and other hydraulic actuators other than the option hydraulic actuator whose hydraulic supply sources are either one or both of the first, second hydraulic pumps, wherein the hydraulic control system further comprises first, second option supply oil passages, first, second other hydraulic actuators supply oil passages connected to the first, second hydraulic pumps respectively, acting as pressurized oil supply passages to the option hydraulic actuator, the other hydraulic actuators; an option merging oil passage that allows the first, second option supply oil passages to merge thereinto; option, other hydraulic actuators control valves that perform oil supply and discharge control to and from the option hydraulic actuator, the other hydraulic actuators respectively; and a control device that controls these option, the other hydraulic actuators control valves; on the other hand, wherein the option merging oil passage comprises the option control valve, and a pressure compensating valve, disposed on an upstream side of the option control valve, that operates in order to maintain a differential pressure, by introducing an inlet side pressure and an outlet side pressure of the option control valve, between the introduced inlet side pressure and outlet side pressure at a predetermined pressure; as well as, is configured such that, by connecting a variable relief valve that can vary a relief setting pressure in response to a control signal from the control device, to a signal pressure introduction oil passage that introduces the outlet side pressure of the option control valve to the pressure compensating valve, and lowering a pressure of the signal pressure introduction oil passage down to a relief setting pressure by the variable relief valve and introducing the pressure to the pressure compensating valve, a pressure of the option merging oil passage on the inlet side of the option control valve can be variably controlled by changing the relief setting pressure of the variable relief valve.

2. The hydraulic control system in the working machine according to claim 1, wherein the hydraulic control system comprises first, second bleed valves for controlling respectively bleed flow rate that flows into an oil tank from the first, second hydraulic pumps in response to a control signal output from the control device, and is configured such that the discharge pressure of the first, second hydraulic pumps is controlled through a bleed flow rate control by the first, second bleed valves; as well as, the control device performs bleed flow rate control so that, in case where the option hydraulic actuator uses either one of the first, second hydraulic pumps as the hydraulic supply source, the discharge pressure of the one hydraulic pump acting as the hydraulic supply source be higher than the discharge pressure of the other hydraulic pump not acting as the hydraulic supply source; and in case where the option hydraulic actuator uses both the first, second hydraulic pumps as the hydraulic supply source, the discharge pressures of the first, second hydraulic pumps be equalized.

3. The hydraulic control system in the working machine according to claim 1, wherein the control device comprises determines first, second required flow rates of the option hydraulic actuator, the other hydraulic actuators, and option first, second margin-added required flow rates obtained by adding a margin flow rate for differential pressure adjustment of the pressure compensating valve to the option first, second required flow rates, which the option hydraulic actuator, the other hydraulic actuators require of the first, second hydraulic pumps respectively, in proportion to operation amounts of the option, the other hydraulic actuators operation levers, and controls the discharge flow rates of the first, second hydraulic pumps, in accordance with these required flow rates; as well as, wherein in case where the other hydraulic actuators are operated, upon performing the discharge flow rate control, the other hydraulic actuators first, second required flow rates are used as required flow rates; on the other hand, in case where the option hydraulic actuator is operated, the option first, second margin-added required flow rates are used as required flow rates.

4. The hydraulic control system in the working machine according to claim 1, wherein the control device determines first, second required flow rates of the option hydraulic actuator, the other hydraulic actuators, and option first, second margin-added required flow rates obtained by adding a margin flow rate for differential pressure adjustment of the pressure compensating valve to the option first, second required flow rates, which the option hydraulic actuator, the other hydraulic actuators require of the first, second hydraulic pumps respectively, in proportion to operation amounts of the option, the other hydraulic actuators operation levers, and controls opening areas of the option, the other hydraulic actuators control valves respectively in accordance with these required flow rates; as well as, wherein regarding the option control valve, upon performing the opening area control, the control device controls an opening area so that a total flow rate obtained by adding up the option first, second required flow rates be supplied to the option hydraulic actuator; on the other hand, regarding the other hydraulic actuators control valves, determines other hydraulic actuators first, second distributed flow rates obtained by distributing the discharge flow rates of the first, second hydraulic pumps in proportion to the option first, second margin-added required flow rates, the other hydraulic actuators first, second required flow rates; and controls the opening areas so that a total flow rate obtained by adding up the hydraulic actuators first, second distributed flow rates be supplied to the other hydraulic actuators.

* * * * *